Sept. 5, 1933. E. E. METCALF 1,925,270
CORN HARVESTER
Filed April 13, 1931 10 Sheets-Sheet 6
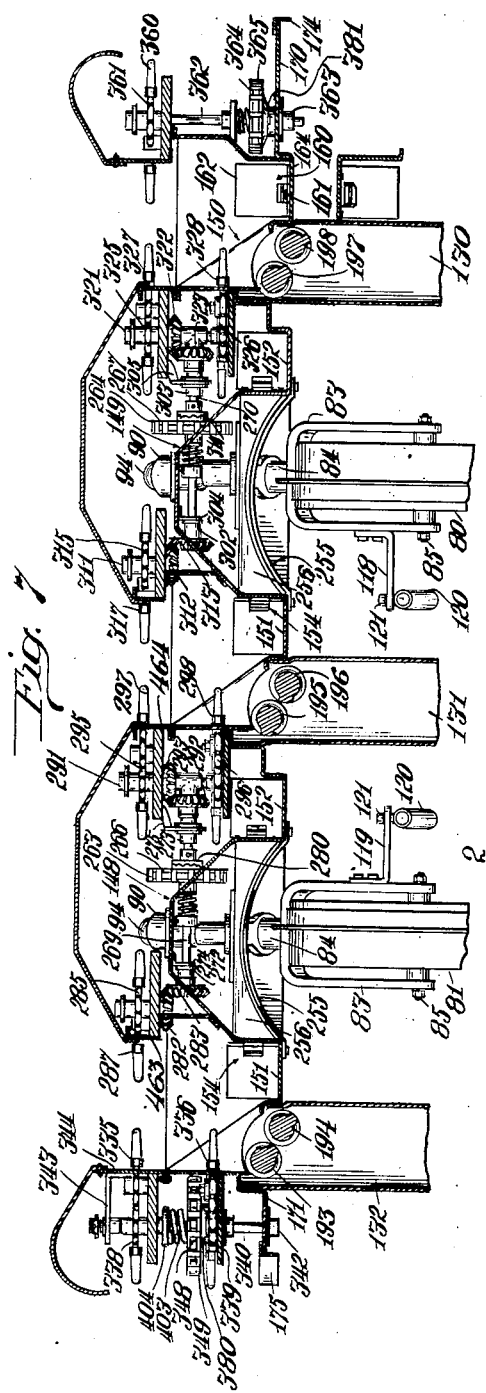
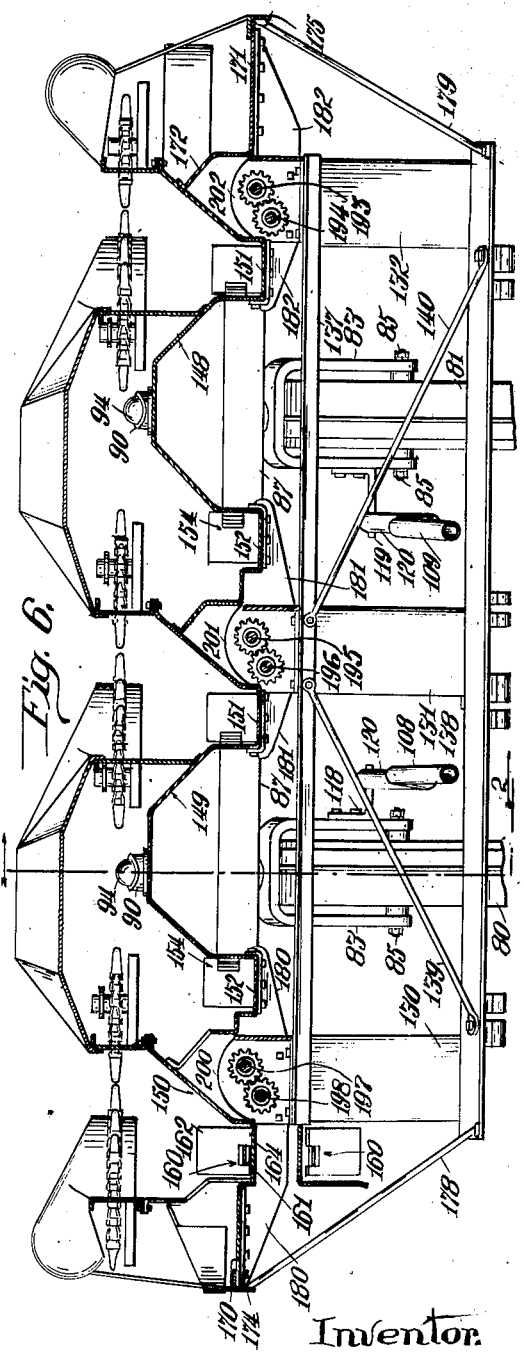
Inventor.
Edgar E. Metcalf
By Brown, Jackson, Boettcher & Dienner
Attorneys.
Witness
Milton Lenoir

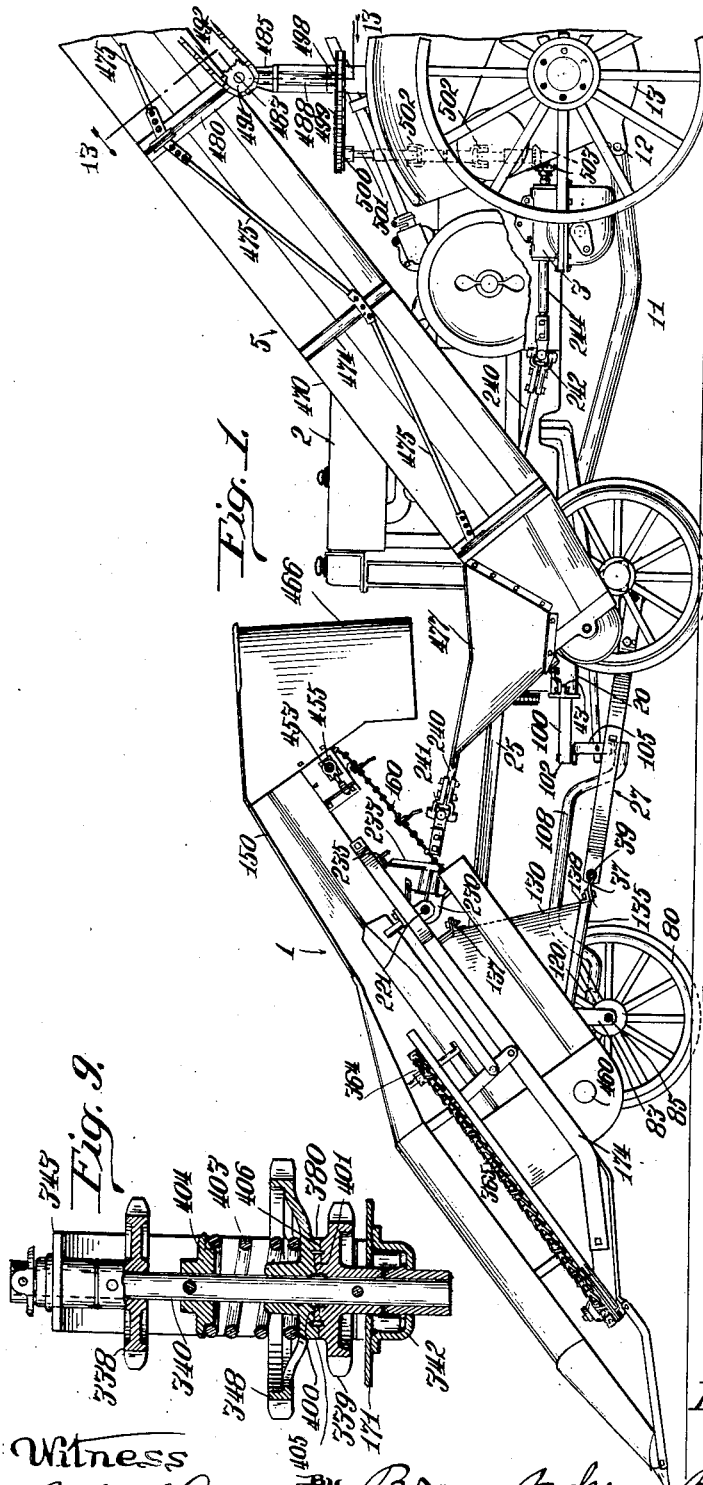

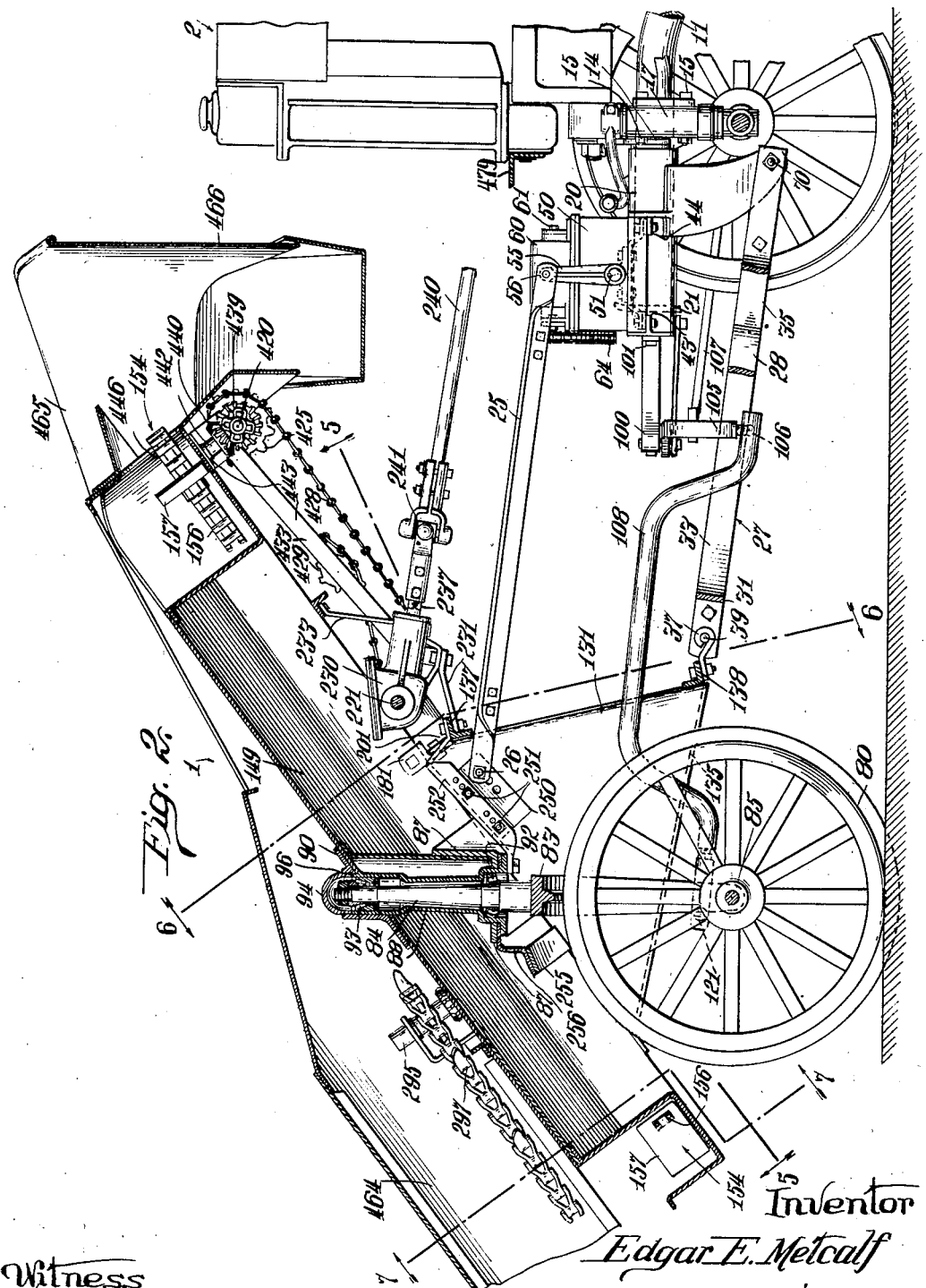

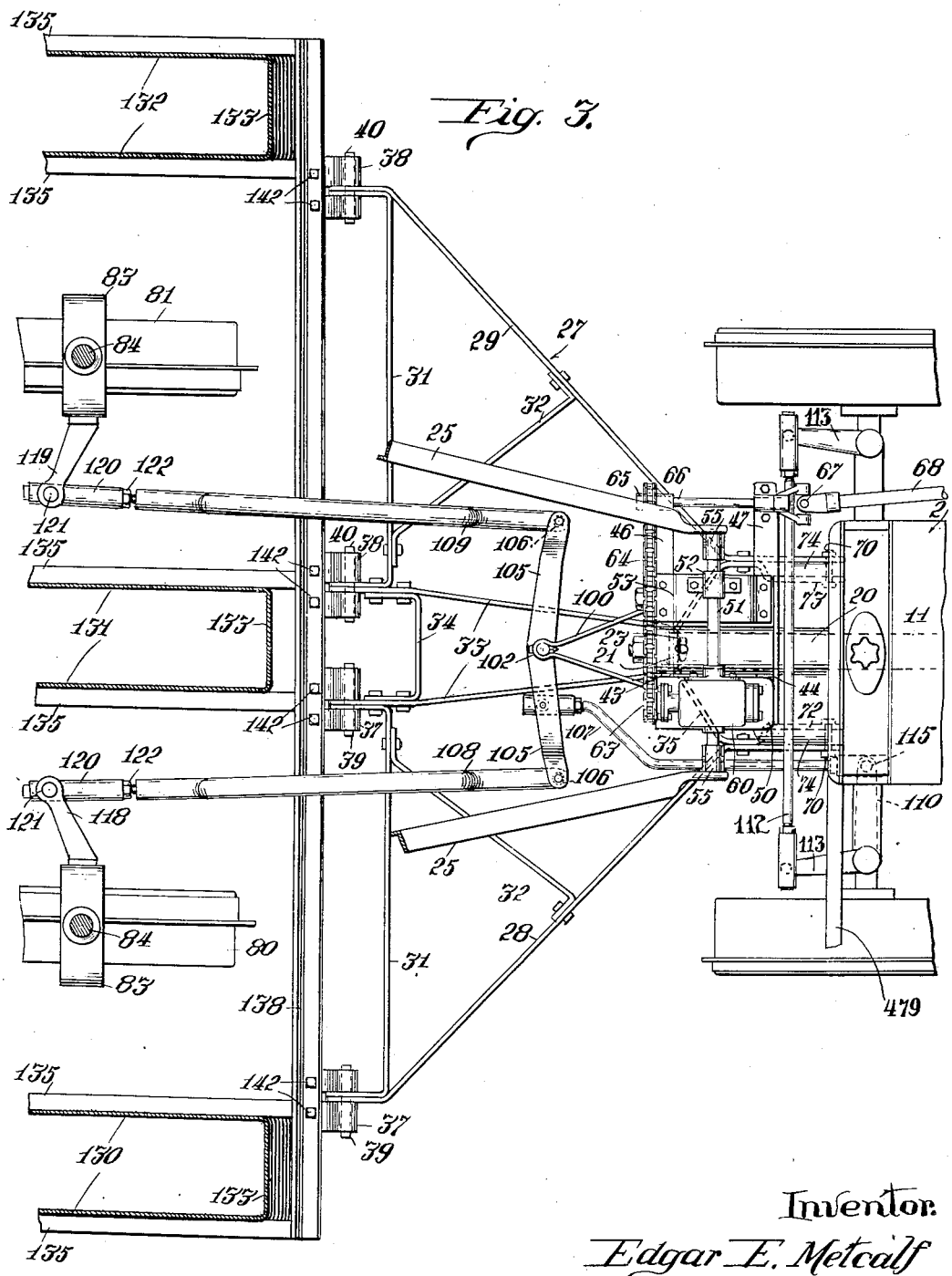

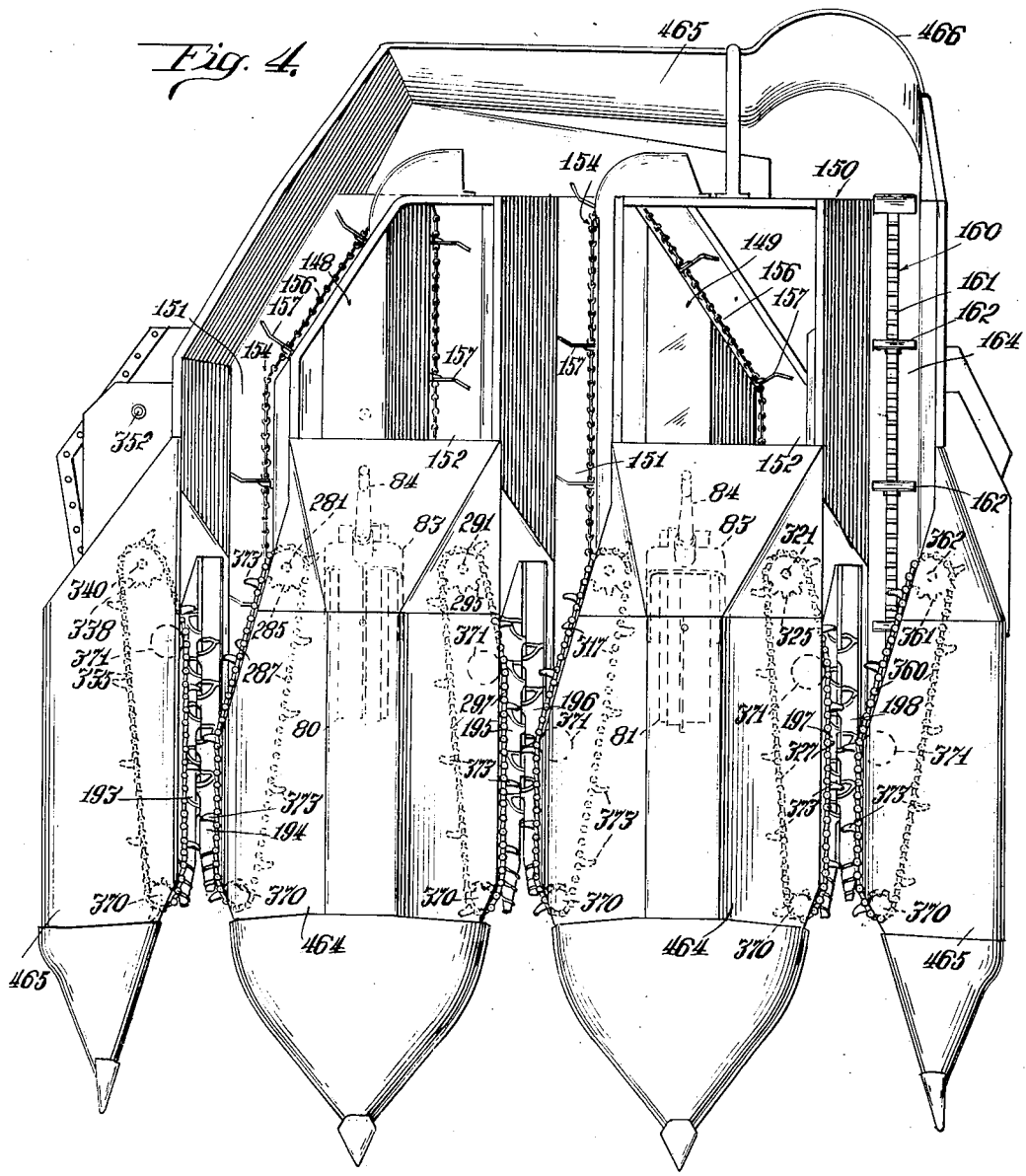

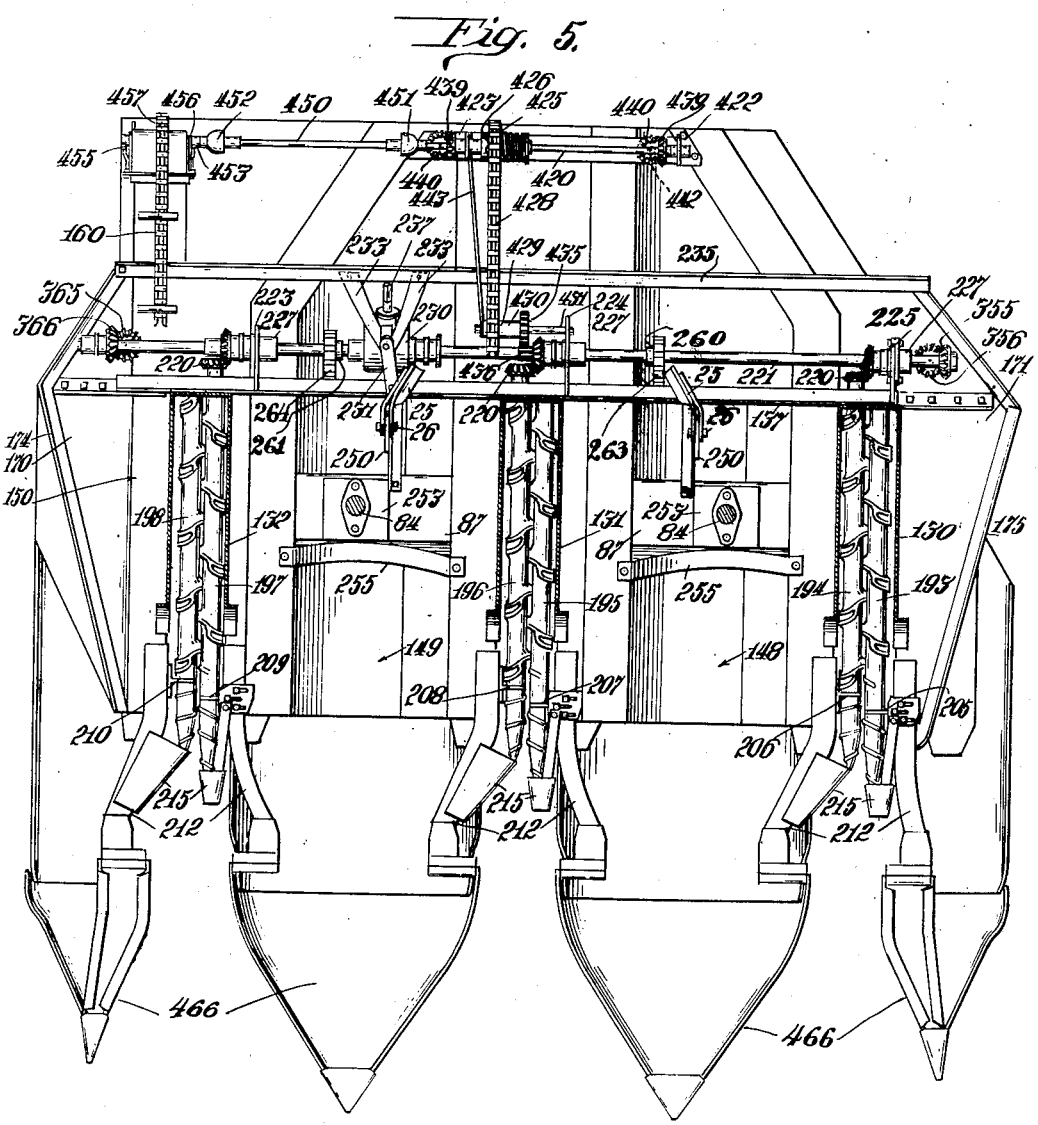

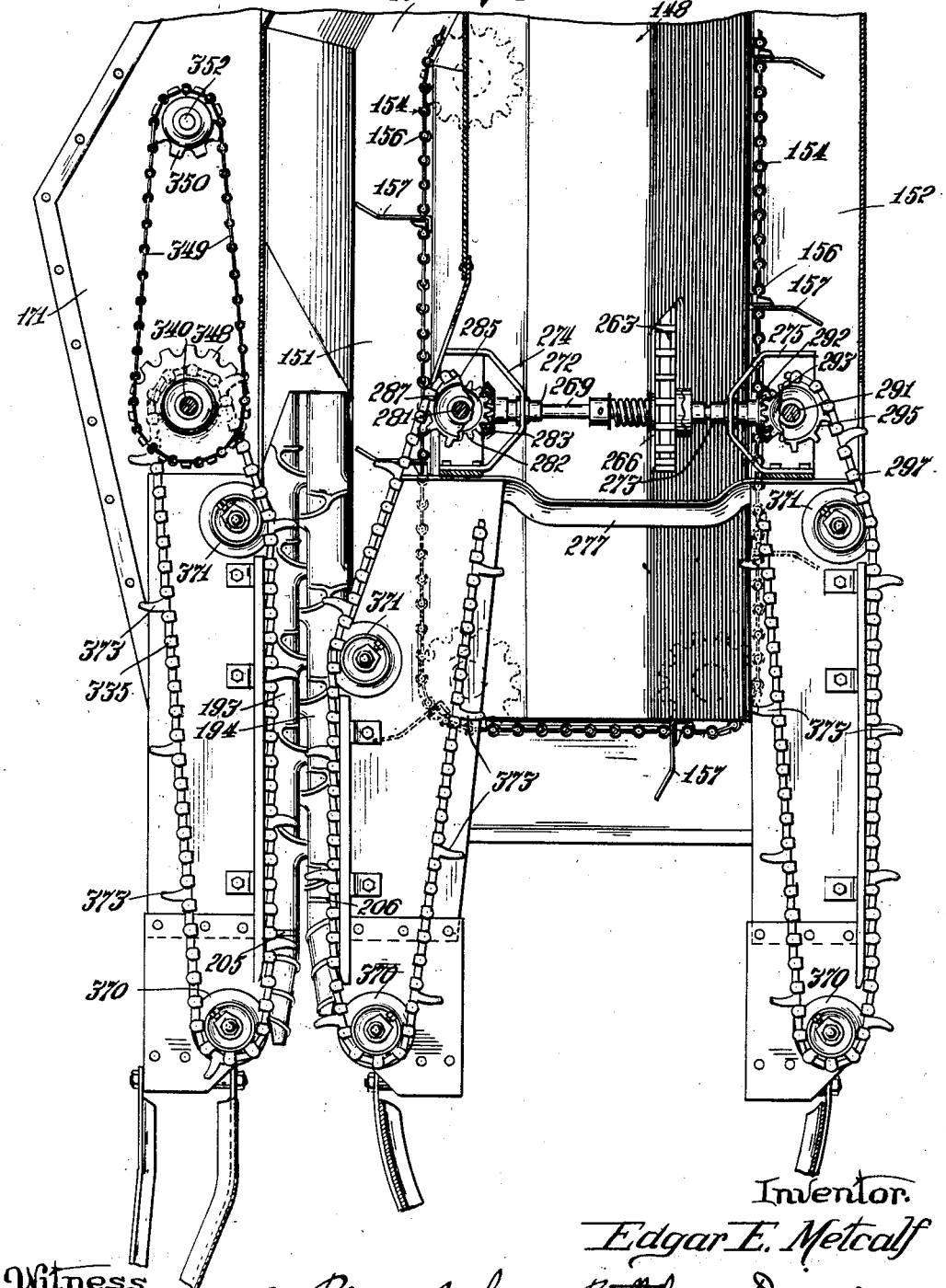

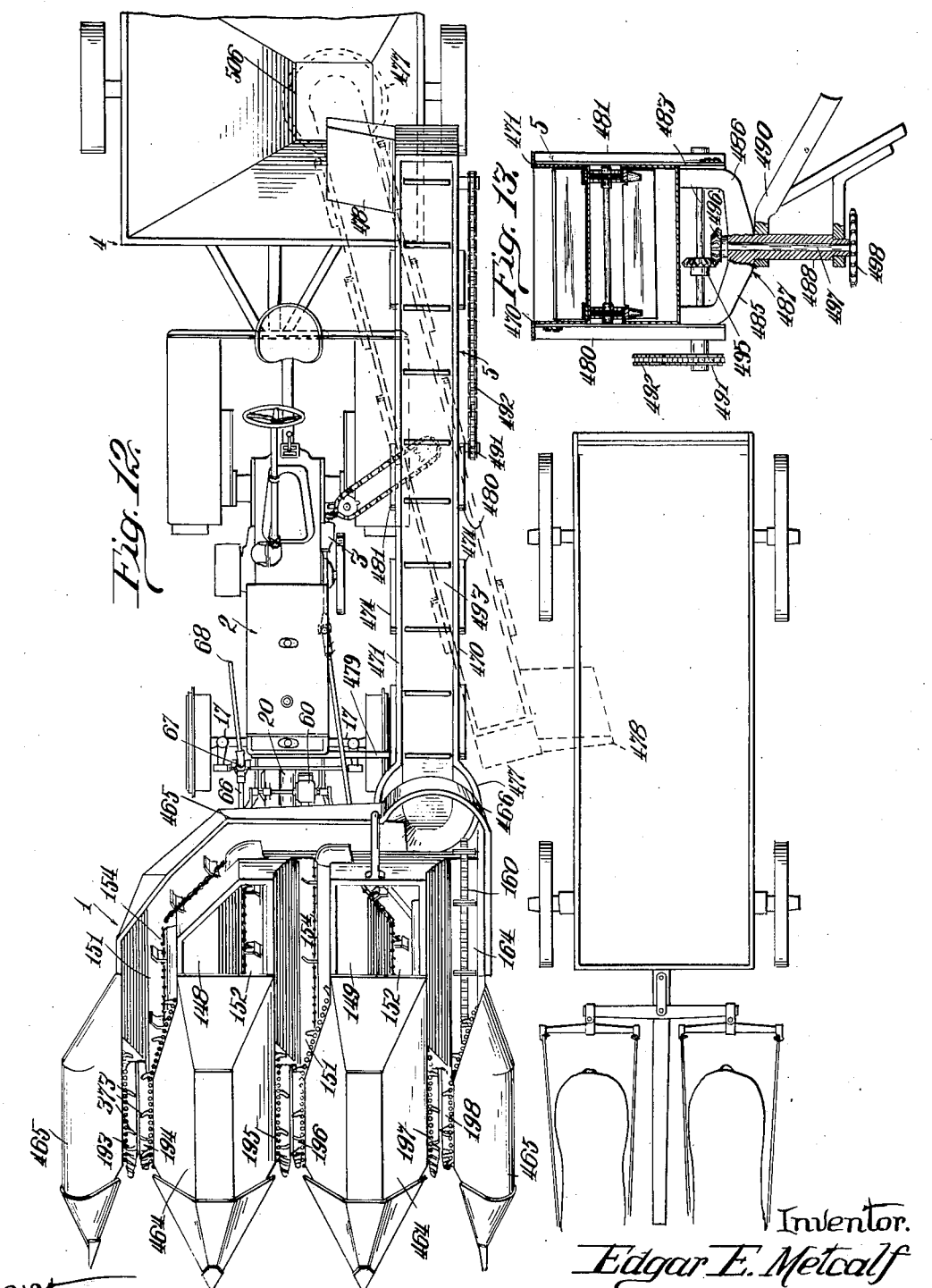

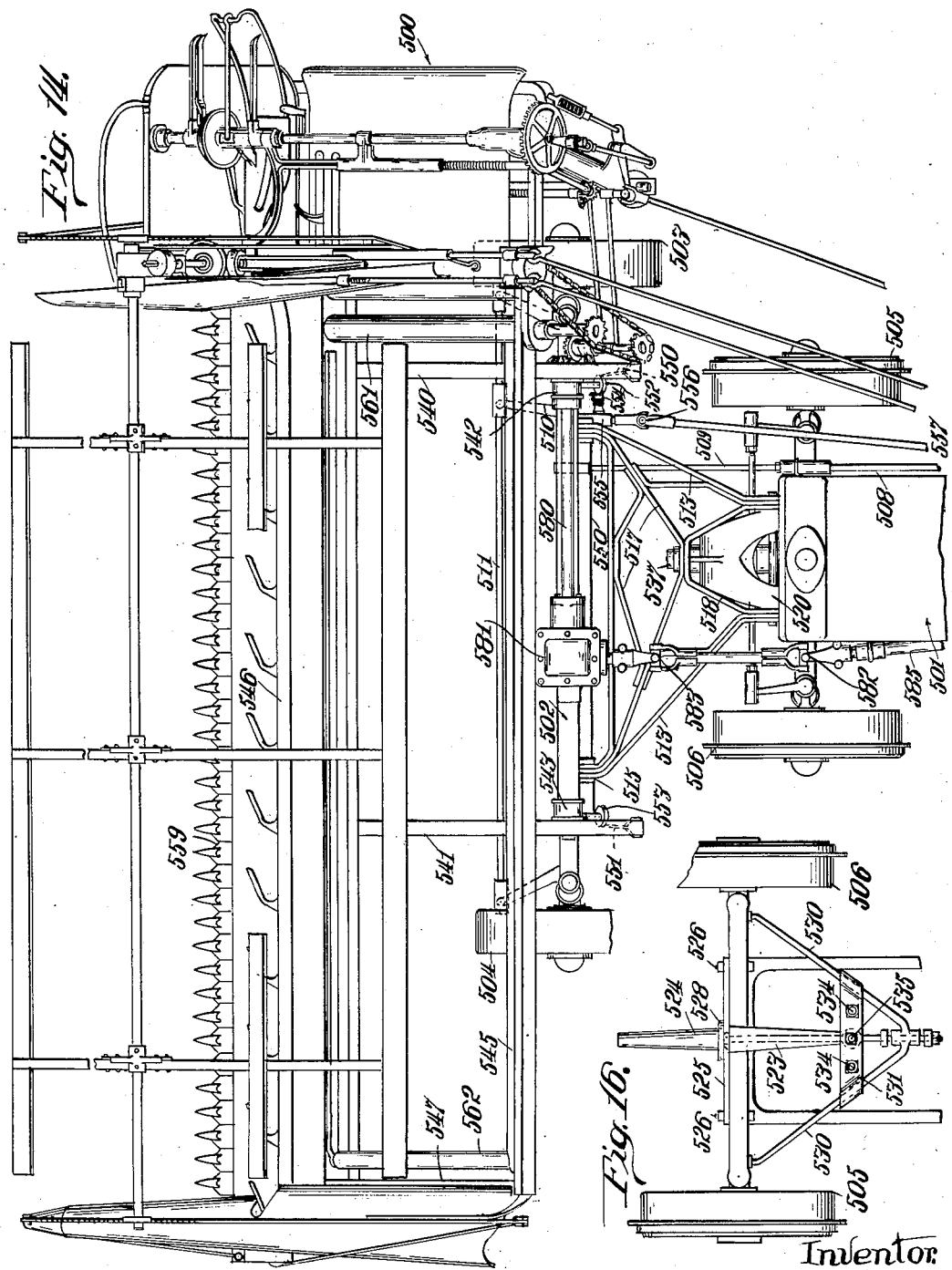

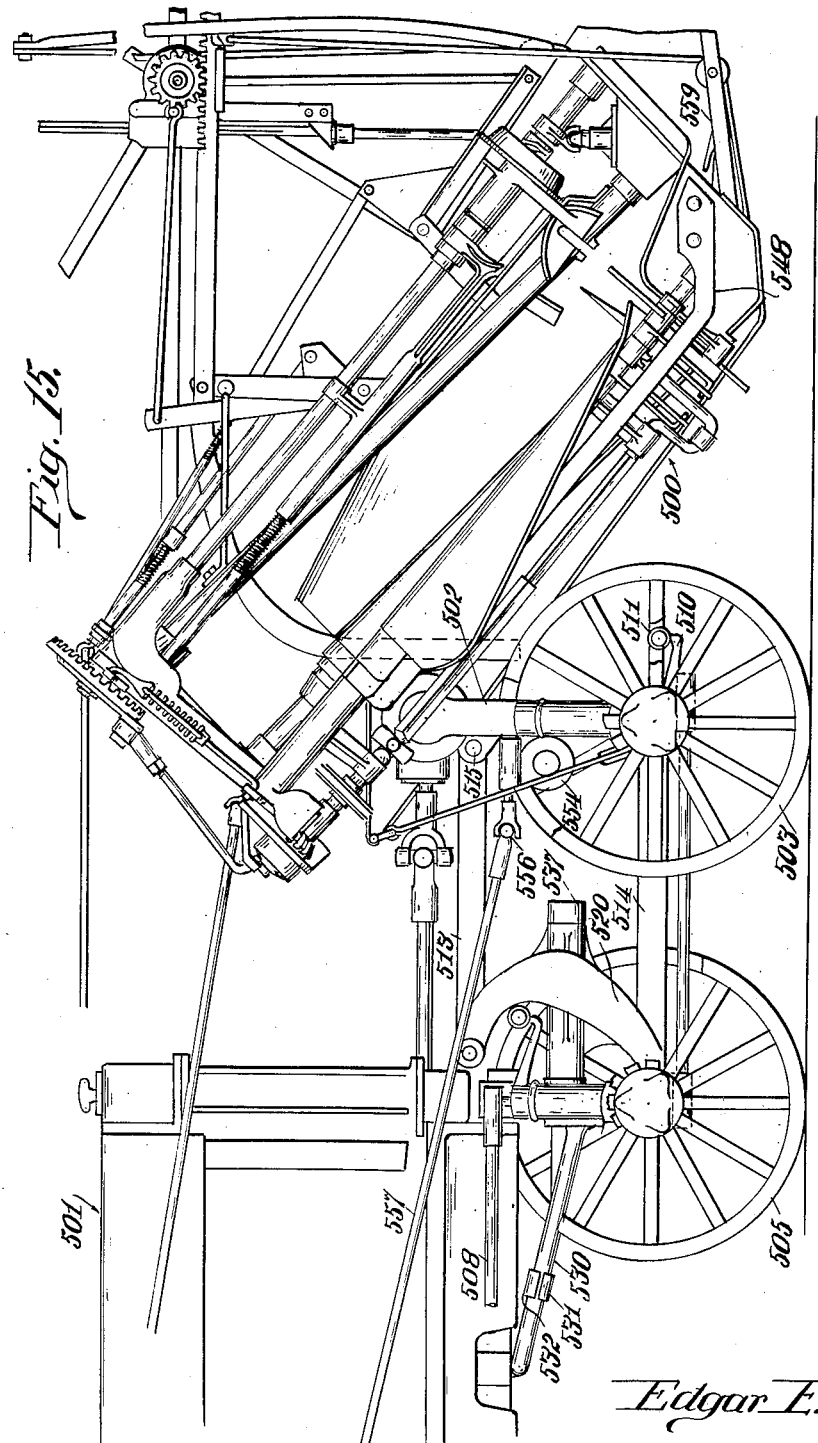

Patented Sept. 5, 1933

1,925,270

UNITED STATES PATENT OFFICE 1,925,270

CORN HARVESTER

Edgar E. Metcalf, Moville, Iowa, assignor to Deere & Company, Moline, Ill., a corporation of Illinois Application April 13, 1931. Serial No. 529,579

57 Claims. (Cl. 56—18)

The present invention relates generally to agricultural machines, more particularly, to those wherein implements are propelled or associated with and driven by tractors.

Specifically, the present invention is concerned with a corn harvester or the like connected to be pushed by a tractor in connection with a receiving tank pulled at the rear of a tractor and conveyor or elevator means for conveying the corn from the harvester to the receiving tank.

One of the main objects of the present invention is the provision of improved connecting means between the tractor and the implement or harvester so that the latter is capable of movement relative to the tractor, as in traversing rough ground, in a vertical direction, but which is so constructed and arranged that relative angular movement in a longitudinal plane is normally prevented but which may be accomplished at the will of the operator when it is desired to tilt the implement, for example, for the purpose of raising or lowering its forward end relative to the ground.

Another feature of importance of the present invention has to do with controlling the dirigible wheels of the implement in conjunction with the ordinary steering means of the tractor in such a way that the rising or falling movement, and also the tilting movement, of the implement with respect to the tractor will not affect the position of the dirigible wheels of the implement or move them out of their steering position. Briefly, this result is secured by arranging the connecting means between the dirigible wheels and the steering mechanism of the tractor in the form of links which are parallel to and of substantially the same length as the connecting links between the implement and the tractor, together with the feature of connecting said links with the dirigible wheels at a point or points lying substantially in the actual axis of tilting of the implement.

The implement chosen for the purpose of illustrating the present invention is a three row corn harvester and in this connection another object of the present invention is the provision of slip clutch means for certain of the operating units of the harvester which will allow any one or more of the units to stop when subjected to an overload and which will not restore operative relations until the units are positioned in proper relation one with the other. As illustrated, these units are in the form of gatherer chains each of which is provided with lugs, the lugs of one chain normally operating in staggered or spaced relation with respect to the lugs on the adjacent chain, each gatherer chain being provided with slip clutch means adapted to release the driving connection to that chain when it is subjected to an overload and which is so constructed and arranged that it will not reengage or reestablish driving connection until the lugs of the adjacent chains are again in proper registration. Thus, in my improved agricultural machine the lugs of adjacent chains automatically stay in proper relation one with the other.

Another object of the present invention is the provision of improved conveyor or elevator means for receiving the corn from the harvester and delivering the same to a tank or container at the rear of the tractor and movable therewith as the machine operates back and forth across the field. Preferably, the elevator or conveyor means comprises an inclined structure pivotally mounted on the tractor itself and movable about a vertical axis so that when the tank or container is filled the elevator may be swung around on its pivotal mounting and utilized for the purpose of receiving the corn from the tank and delivering the same to a point laterally of the machine, usually to a wagon or motor truck driven along side the machine.

Still further, another object of the present invention is the provision of an improved corn harvester wherein sheet metal stampings are employed and which are of sufficient strength to be self supporting, thus obviating or dispensing with a number of the heavy angle or channel members usually found in the main frame of such implements whereas, according to the present invention the sheet metal stampings in themselves form the frame of the implement. In this way, a lighter yet sturdier and longer lived implement is provided. Another object of the present invention has to do with the conveyor means for removing the ears of corn from the various sets of snapping rolls. Generally speaking, three conveyor means are provided, two of which embrace the supporting wheels of the implement and operate in a forward inclined plane, while the third conveyor operates in a longitudinal vertical plane.

Other objects and advantages of the present invention will be apparent to those skilled in the art after a consideration of the following detailed description of the preferred structural embodiment, taken in conjunction with the accompanying drawings in which:

Figure 1 is a side elevation of an agricultural machine constructed according to the principles of the present invention and showing the harvester, the vertically pivoted elevator and the tractor;

Figure 2 is a view, partly in section and partly in elevation, corresponding approximately to a view along the line 2—2 of Figure 6;

Figure 3 is a fragmentary view showing the connections between the steering means of the tractor and the dirigible wheels of the implement;

Figure 4 is a top plan view of the corn harvester showing the relative positions of the gatherer chains and the conveyor chains, as well as the receiving troughs and hopper;

Figure 5 is an inverted view taken substantially along the line 5—5 of Figure 2 and looking upward in the direction of the arrows;

Figure 6 is a sectional view taken substantially along the line 6—6 of Figure 2 and looking forwardly in the direction of the arrows;

Figure 7 is also a sectional view through the corn harvester taken substantially along the line 7—7 of Figure 2 and looking backward in the direction of the arrows;

Figure 8 is an enlarged fragmentary view, partly in section and partly in elevation showing a portion of the snapping mechanism on the right hand side of the implement, the snapping mechanism on the opposite side of the implement being substantially the same;

Figure 9 is an enlarged sectional view through one of the slip clutch mechanisms showing the relation of the various parts, the other slip clutch mechanisms being substantially identical with that shown in this figure;

Figures 10 and 11 are perspective views of the two cooperating sprockets having the means which prevent reengagement of the slip clutch until one of the sprockets has been turned a predetermined amount;

Figure 12 is a top plan view of the entire machine and illustrating particularly the two positions of the swinging elevator which receives corn from the harvester and delivers the same to the tank in the rear of the tractor, and which is also operable to receive corn from the tank and deliver it to a wagon drawn along side the machine;

Figure 13 is a detail view, partly in section, showing the mounting of the elevator upon the tractor and corresponding to a view taken along the line 13—13 of Figure 1;

Figure 14 is a plan view similar to Figure 4 but illustrating the manner of connecting a harvester to a tractor;

Figure 15 is a side elevation of the implement shown in Figure 14; and

Figure 16 is a bottom view of the tractor showing the special mounting by which the harvester is connected with the front end of the tractor.

This application is a continuation in part of my co-pending application Serial No. 406,192, filed November 11, 1929.

Referring more particularly to Figures 1 and 12, the entire machine is seen to comprise an implement in the form of a corn harvester 1, a tractor 2 having a power take-off 3, the usual type found on farms today, a grain tank 4 in the rear of the tractor, and an elevator 5 arranged in one position to receive corn from the harvester 1 and deliver it to the grain tank 4.

One of the principal features of the present invention has to do with the connecting means between the implement 1 and the tractor 2. This connecting means is best shown in Figures 2 and 3 and will now be described. The tractor 2 carries centrally thereof a longitudinally extending pipe 11 fastened at its rear end to the transversely extending draw bar 12 on the tractor, the ends of the draw bar 12 being connected to the drive housings 13 at either side of the tractor. The forward end of the pipe 11 extends through a perforation in a plate 14 which is bolted by bolts 15 across the forward face of the arched front axle 17 of the tractor. The end of the pipe 11 extends forwardly of its supporting plate 14 and is thereby arranged to carry journaled thereon a main supporting casting 20, the latter being held in position thereon by means of a pin 21 which passes through two elongated slots 23, one in the top and one in the bottom of the tubular portion of the casting 20, and aligned perforations in the forward end of the pipe 11. By virtue of this slotted mounting the casting 20 is arranged to have limited rocking movement about its journal support on the forward end of the pipe 11.

The draft connection between the front end of the tractor and the implement or corn harvester 1 comprises a pair of link structures arranged in substantial parallelism and of approximately the same length. These link structures are pivoted to the implement and to the tractor so that the pivot points thereof define a parallelogram, whereby the implement is arranged to have vertical movement relative to the tractor while its angular position with respect to the tractor remains unchanged.

The upper link structure comprises a pair of links 25 pivoted at their forward ends to the implement 1, as at 26, and the lower link structure comprises a suitably formed framework 27 including bars 28 and 29 and suitable cross braces 31, 32 and 33 and brackets 34 and 35. The lower link connecting structure 27 is pivotally connected with the implement by means of apertured lugs 37 and 38 receiving pins 39 and 40, these parts being arranged in pairs as best shown in Figure 3 and adapted to receive the forwardly turned ends of the bars 28 and 29 and the braces 31.

The rearward ends of the links 25 and 28 are connected to the tractor 2 by virtue of being connected with the main supporting casting 20. The casting 20 is provided on the left hand side with a pair of bracket ears 43 and 44 and the right hand side of this casting is provided with a pair of laterally extending brackets 46 and 47. The bracket ears 43 and 44 support a gear housing 50 in which is journaled a rock shaft 51 to which is secured a worm sector (not shown) operating within the housing 50. The right hand end of the rock shaft 51 is journaled in a bearing 52 supported or mounted on a plate 53 bolted to the brackets 46 and 47 of the casting 20. Each end of the rock shaft 51 carries an arm 55 fixed thereto, as by a key, and preferably extending upwardly although this may, of course, vary. The links 25 are pivoted to the respective outer ends of the arms 55 by means of pivot pins 56.

The position of the rock shaft 51 is controlled by operating means which includes the worm sector mentioned above and which is mounted on the rock shaft 51. The top of the gear housing 50 carries a cover plate or auxiliary housing 60 within which is journaled a longitudinally extending worm shaft 61 carrying a worm (not shown) in engagement with the worm sector mentioned above. The forward end of the worm shaft 61 carries a sprocket 63 over which is trained a sprocket chain 64. The chain 64 is also trained over a sprocket chain 65 mounted on the forward end of a shaft 66 journaled in the ends of the brackets 46 and 47, as best shown in Figure 3, and which is connected by means of a universal joint 67 to a control shaft 68 which extends rearwardly to a point near the operator's station on the tractor where the shaft 68 may be supported in a suitably mounted bearing and provided with a crank by means of which the shaft 68 can be rotated to swing the upper ends of the arms 55 forwardly or rearwardly.

The rearward end of the link structure 27 is connected to the casting 20 by means of pivot bolts 70 passed through apertures in the ends of the bars 28 and 29 and the rearward spaced ends 72 and 73 of the bracket 35, as best shown in Figure 3. The pivot bolts 70 are received in the laterally deflected and downwardly extending ends of a pair of arms 74 fixed to or formed integrally with the casting 20.

The points 26, 56, 70, 39 and 40 therefore form a parallelogram by reason of which the rising and falling movements of the implement with respect to the tractor will not affect the angular position of the implement in a vertical longitudinal plane, that is, in its rising and falling movements the implement will occupy positions in successive parallel planes and will always occupy the same angular relation with respect to the tractor. The implement may be leveled by tilting the same backwardly or forwardly, this being conveniently accomplished through the controlled forward or backward displacement of the links 25. As will be clear from Figure 2, whenever the rock shaft 51 is turned or rotated to rock the arms 55, the links 25 are moved forwardly or backwardly and the machine is rocked on its supporting wheels. As explained above and as will be clear from Figure 3, the rock shaft 51 is controlled by means of the control shaft 68 and the associated sprocket and worm gear connections.

Referring again to Figure 2, it will be observed that when the links 25 are moved forwardly the upper part of the implement 1 will also be moved forwardly while its supporting wheels will be moved rearwardly a slight amount, due principally to the upward swinging of the points 39 and 40 about the points 70 as a center. Thus, when the shaft 51 is rocked the implement 1 will be rocked about a transverse axis lying somewhere above the axis of its supporting wheels, depending upon the structural characteristics of the link means 25 and 27.

In connection with this construction the second important feature of the present invention is realized. The supporting wheels for the implement 1 are designated by the reference numerals 80 and 81. These wheels are dirigible wheels, that is, they may be turned about a vertical axis to steer the implement, and each wheel is journaled in the lower end of a forked member 83 carrying a vertical stem 84. The wheels 80 and 81 are journaled in their respective forks 83 by means of axles 85, as shown in Figures 2 and 7. The framework of the implement 1 is of novel construction and will be described more in detail later, but it is to be noted here that the framework of the implement 1 is carried upon the forks 83 by means of transverse brackets 87 having their ends connected to the framework of the implement and each being provided with a hollow sleeve casting 88 connected with the bracket 87 and with a plate casting 90 on the body of the implement. Each of the vertical stems 84 is journaled for rotation about its axis in the hollow sleeve casting 88 by means of roller bearings 92 and 93 preferably arranged to take both axial and radial loads, as best shown in Figure 2. A semi-spherical cap 94 threads into a circular flange 96 provided on the plate casting 90 and around the upper end of the sleeve 88. Preferably the brackets 87 are formed of angle bars although any equivalent structural elements may be employed. In this way the entire weight of the implement is supported upon the dirigible wheels 80 and 81.

The second feature mentioned above is concerned with steering the dirigible wheels 80 and 81 in conjunction with the usual steering means of the tractor itself. A forwardly extending bracket 100 is secured to the front face of the main supporting casting 20, as by bolts 101, and its forwardmost portion is formed as a yoke 102 which pivotally supports a transverse beam 105. The arms of the beam 105 extends laterally and carry pivot studs 106 to which the rear ends of drag links 108 and 109 are secured. The steering beam 105 is connected to the regular steering system of the tractor 2 through a drag link 107 pivotally connected to the beam 105 and at its rear end to an arm 110 fixed on the vertical spindle of the left hand front tractor wheel. The regular steering system of the tractor itself is represented by the customary drag link 112 connecting the two steering arms 113 connected respectively with the two front tractor wheels. The connection between the link 107 an the arm 110 is through a pivot stud 115, best shown in Figure 3. Preferably, the arm 110 occupies a position in a plane below the drag link 112.

The forward ends of the drag links 108 and 109 are connected, respectively, to steering arms 118 and 119 fixed to the forked members 83. The connections between the links 108 and 109 and their corresponding steering arm takes the form of a sleeve 120 swiveled, as at 121, to its steering arm and having an adjustable connection 122 with the corresponding drag link. These various steering arms, beams and links are preferably so arranged that as the usual or customary steering means on the tractor is actuated the dirigible wheels 80 and 81 supporting the implement in front of the tractor are turned the proper amount to move about the same point or center of turning as the regular front wheels of the tractor. The points of connection 121 between the drag links 108 and 109 and the arms 118 and 119 are arranged in a plane slightly above the axis 85 of the implement wheels, as shown in Figure 2, while the drag links 108 and 109 lie substantially in the plane of or parallel with the link structure 27 and are of the same length, fore and aft of the machine, as the lengths of the link structures 25 and 27. By arranging the drag links 108 and the link structures 25 and 27 in this manner any vertical displacement of the implement 1 relative to the tractor 2 will not produce any steering movement of the wheels 80 and 81, hence these wheels will not be moved out of alignment with respect to the line of advance as the machine moves over uneven ground.

When the rock shaft 51 is actuated to tilt the implement 1 fore and aft the lower part of the implement including its supporting wheels 80 and 81 will be moved away from the tractor a small amount while the upper part of the implement 1 will be moved towards the tractor. The implement therefore rotates about a transverse axis a short distance above and forward of the axis of the dirigible wheels 80 and 81. The points 121, as indicated in Figure 2 and as referred to above, are disposed substantially coincident with this axis, whereby tilting of the implement will not affect the position of the wheels 80 and 81 or in any manner cause any movement thereof relative to the implement about their vertical axes defined by the journaled stems 84. Since, as described, the links 25 and 27 are so arranged that rising and falling movement of the implement 1 with respect to the tractor will not cause any angular displacement of the implement in a vertical longitudinal plane and since, as just described, tilting the implement to level the same by rocking the shaft 51 will not affect the steering position of the dirigible wheels 80 and 81, it will be noted that my improved connection between the implement 1 and the tractor 2 is one which provides all of the necessary flexibility and adjustability without any consequent undesirable shifting of the position of the implement.

The mechanism of the implement 1 itself will now be described including my improved and novel framework thereof. The construction of the corn harvester is unique in that it is built of sheet metal stampings which themselves, in the main, form the frame of the implement. In other words, no separate and heavy framework of angle iron construction or other structural shapes is required, the harvester being built up of sheet metal stampings of sufficient thickness so as not to require a separate frame.

The sheet metal stampings which act as a main frame of the implement include three triangularly shaped tunnels 130, 131 and 132, (see Figures 2, 3, 6 and 7). The tunnels are open at the top and bottom sides and are closed at the rear, as shown at 133 in Figure 3, and have their lower edges reinforced by suitable angle irons 135. The tunnels 130, 131 and 132 are connected together at their rear ends by means of upper and lower transverse angle irons 137 and 138 extending transversely across the implement and suitably braced by means of diagonally extending braces 139 and 140, (see Figure 6). The lugs 37 and 38, to which the lower link structure 27 is pivoted, are secured to the lower angle iron 138 as by bolts 142.

The top edges of the three tunnels just described lie in a downwardly and forwardly extending plane, as indicated in Figure 2, and fixed to the top downwardly inclined edges of the tunnels are the elevator or conveyor bodies 148, 149 and 150. These elevator bodies are formed of sheet metal stampings as shown in cross section in Figures 6 and 7 from which will be noted that the elevator or conveyor bodies 148 and 149 are similar, both being provided with two troughs 151 and 152 in which elevator or conveyors 154 move, (see Figure 4). Each of the conveyor or elevator means 154 includes a chain 156 having a series of paddles or flights 157 which travel upwardly and rearwardly in the trough 151 and downwardly and rearwardly in the trough 152.

As will be best understood from Figures 6 and 7, the elevator or conveyor bodies 148 and 149 are, in section, substantially inverted channel shaped, the troughs 151 and 152 of which are carried upon the ends of the brackets 87 referred to above in connection with the dirigible wheels 80 and 81.

The elevators or conveyors 154 operate in a downwardly and forwardly inclined transverse plane. A third elevator or conveyor 160 comprising an endless chain 161 having paddles or flights 162 travels in a vertical longitudinally extending plane in a trough 164 formed in the elevator or conveyor body 150. The outer wall of the elevator or conveyor body 150 extends laterally to form a bracing web 170, and a similar bracing web 171 is provided on the right hand side of the machine, as viewed in Figure 6, this web 171 having an upwardly extending and inwardly deflected portion 172 by which it is connected to the right hand wall of the trough 151 formed on the elevator or conveyor body 148. These webs 170 and 171 taper inwardly toward the front of the machine, as indicated in Figures 5 and 7, and are reinforced at their outer edges by angle irons 174 and 175. Near their upper ends, as best shown in Figure 6, the angle irons 174 and 175 are connected with the lower transverse angle member 138 by means of braces 178 and 179.

Three brackets 180, 181 and 182 are fixed to the three tunnels 130, 131 and 132, respectively, at the upper ends thereof, as best shown in Figure 6. As there shown these brackets support at their ends the various elevator or conveyor bodies and have flanges bolted or otherwise secured to the various elevator or conveyor bodies. The bracket 180 supports at one end the elevator body 150 and the bracing web 170 and at the other end this bracket supports the portion of the elevator or conveyor body 149 which forms the trough 152. The bracket 181 at one end supports the trough 151 of the elevator or conveyor body 149 and at the other end it supports the trough 152 of the elevator body 148. The bracket 182 is similar to the bracket 180 in that at one end it supports the trough 151 of the elevator or conveyor body 148 and at the other end it supports the bracing web 171 on the right hand side of the machine.

The brackets 180, 181 and 182 may be secured to the tunnels 130, 131 and 132 in any manner desired, as by bolting, welding, or the like, but preferably the attachment of the brackets to the tunnels is partly or wholly accomplished by the upper bearing plates in which the upper ends of the various snapping rolls are journaled. The corn harvester being described is a three row machine and is therefore provided with three sets of snapping rolls which are designated by reference numerals 193 and 194, 195 and 196, and 197 and 198. The upper ends of these snapping rolls are journaled in bearing plates 200, 201 and 202 which lie against the brackets 180, 181, 182 and provided with bolts passing through the plates, the brackets and the rear walls of the tunnels respectively. Each of the bearing plates 200, 201 and 202 are also provided with a lower flange which is bolted to the horizontal flange of the transverse frame bar or angle iron 137. At their lower ends the snapping rolls 193 to 198 are supported in brackets 205 to 210, each of which is secured to one of the angle iron members 212 extending forwardly from the lower ends of the elevator bodies, as best shown in Figure 5. Guards or shields 215 are provided for the forward points of the snapping rolls and are secured to the angle iron members 212, as indicated in Figure 5.

The upper ends of the snapping rolls are each provided a spur gear, and as shown in Figure 6 the spur gears of the two rolls forming a set intermesh so that both snapping rolls of each set are driven when one of the rolls is rotated. For this purpose the snapping rolls 194, 196 and 197 are extended rearwardly and each carries a bevel gear 220 fixed thereto. A drive shaft 221 for the snapping rolls extends transversely of the harvester and is carried in three upwardly and rearwardly extending bracket arms 223, 224 and 225 secured to or formed integrally with the bearing plate members 200, 201 and 202, respectively. Each of these three bracket arms is provided with a bearing or journal 227 for supporting the drive shaft 221, the latter carrying three bevel gears keyed thereto and meshing respectively with the three bevel gears 220 on the snapping rolls 194, 196 and 197.

The main transverse drive shaft 221 is driven from the tractor through a set of bevel gears housed in a housing 230 supported by means of a bracket 231 bolted to the transverse angle iron 137 and a pair of brackets 233 bolted to an upper transverse angle iron 235 extending transversely across the machine above the angle iron 137 and connecting the three elevator or conveyor bodies to stiffen the same prevent separation of the tunnels 130, 131 and 132 at their upper ends. The driving bevel gear in the housing 230 is driven from a bevel gear secured to a short shaft 237 journaled in an extended bearing boss 238 on the housing 230. This shaft is driven from the power take-off 3 of the tractor by means of a power shaft 240 extending longitudinally of the machine and connected by universal joints 241 and 242 to the shaft 237 and to the power take-off shaft 244 of the power take-off 3, respectively. Thus, rotation of the power shaft 240 will rotate the drive shaft 221 which will, in turn, drive the snapping rolls through the bevel gears 220 and 228 and through the spur gears fixed to the upper ends of the snapping rolls.

As best shown in Figures 2 and 5, the links 25 are connected with the implement 1 by means of a plate 250 at each side of the machine and adjustably secured, as by bolts 251, to a downwardly and forwardly inclined bracket 252 connected at its rear end to the upper flange of the angle iron 137 and bolted at its lower end to the bottom flange 253 of the hollow sleeve casting 88, see Figure 5. A plurality of bolt holes are provided in the flange of the angle bracket 252 to provide for the positioning of the plate 250 in a number of different positions, and the plate 250 is also provided with a plurality of apertures to receive the pivot bolt 26 connecting the link 25 to the implement. A second bracket 255 spanning the trough portions of the elevator bodies 148 and 149 and connected to the bracket 87 by means of a web 256 is provided for the purpose of strengthening these parts.

A plurality of gatherer chains cooperating with the snapping rolls described above for the purpose of feeding the stalks of corn to the rows are provided and are best illustrated in Figures 4, 6, 7 and 8. Preferably, three of such chains are provided for each set of two snapping rolls, see Figure 7, and the driving connections to these chains are preferably so constructed and arranged that should any one or more of the chains be subjected to an overload that chain or chains will be released and cannot come into driving engagement again until in a predetermined relation with respect to the adjacent chains so that its lugs will always be midway the lugs on the other chain when in operation.

Referring for the moment to Figure 5, it will be noticed that the main transverse drive shaft 221 carries a pair of sprockets 260 and 261 over which are trained, respectively, the driving chains 263 and 264. The driving chains 263 and 264 drive a pair of sprockets 266 and 267 mounted on shafts 269 and 270 positioned a short distance downwardly and forwardly with respect to the main driving shaft 221.

Referring more particularly to Figures 7 and 8, the short transverse shaft 269 is carried in bearings 272 and 273 respectively mounted in brackets 274 and 275 supported from an angle iron 277 extending across the lower end of each of the elevator or conveyor bodies 148 and 149 and securely fixed thereto. Figure 8 illustrates the construction at the right hand side of the machine, and it is to be understood that the construction of these parts at the left hand side of the machine is identical with that illustrated for all practical purposes. As shown in Figure 7, the sprocket 266 is connected to the shaft 269 through a slip clutch mechanism 280.

The bracket 274 is provided with means supporting a vertical stub shaft 281 which carries at one end a bevel gear 282 meshing with a bevel gear 283 fixed on the outer end of the shaft 269. The upper end of the stub shaft 281 carries a sprocket 285 over which the upper bight of a gatherer chain 287 is trained. As illustrated in Figure 7, the gatherer chain 287 is the inner one of the three gatherer chains associated with the snapping rolls 193 and 194.

The other bracket 275 also supports a stub shaft 291 which is driven through bevel gears 292 and 293 respectively mounted on the shaft 269 and the stub shaft 291. The stub shaft 291 carries two sprockets 295 and 296 mounted at the top and at the bottom thereof and serving to drive the two gatherer chains 297 and 298.

The gatherer chains on the other side of the machine and opposite the chains just described are driven in a similar manner, the parts cooperating with the short transverse shaft 270 correspond to the parts cooperating with the short transverse shaft 269, and the short transverse shaft 270 is supported in bearings 302 and 303 carried in brackets 304 and 305 supported in substantially the same manner as the brackets 274 and 275. The sprocket 267 is connected with the shaft 270 by means of a slip clutch 310. The stub shaft 311 is journaled in the bracket 304 and is driven from the shaft 270 through bevel gears 312 and 313. A sprocket 315 is secured to the shaft 311 at the top thereof and serves to drive the gatherer chain 317.

The stub shaft 321 is driven from the shaft 270 through bevel gears 322 and 323, the shaft 321 carries sprockets 325 and 326 at the top and at the bottom thereof, as in the case of the stub shaft 291 described above. Gatherer chains 327 and 328 are respectively trained over the sprockets 325 and 326.

The outermost driving chains 335 and 336 on the right hand side of the machine, which is the left hand end of Figure 7, are driven by a pair of sprockets 338 and 339 which are carried by a vertical stub shaft 340 carried by a bearing 342 in the web 171 and by a bracket 343 carried by a sheet metal riser 344 secured to the outermost side portion of the elevator or conveyor body 148. The stub shaft 340 carries another sprocket 348 which is connected by means of a driving chain 349 to a driving sprocket 350 carried on a vertically positioned stub shaft 352 supported by the flange 171. The shaft 352 is spaced upwardly and rearwardly with respect to the shaft 340 and is driven by means of a bevel gear 355 at the lower end thereof and meshing with a bevel gear 356 keyed or otherwise secured to one end of the main transverse driving shaft 221, as best shown in Figure 5.

The single gatherer chain 360 at the other side of the implement is driven in a similar manner. The chain 360 is trained over a sprocket 361 fixed to the upper end of a shaft 362 supported by bearing means 363 in the web 170. The lower end of the shaft 360 carries a sprocket 364 over which is trained a driving chain 365 corresponding for all practical purposes to the driving chain 349 on the other side of the machine and driven in substantially the same manner by a shaft and sprocket means driven through bevel gears 365 and 366, as shown in Figure 5, the latter bevel gear being secured to the transverse driving shaft 221. The lower ends of all of the gatherer means are arranged to operate over guide rollers indicated generally by the reference numeral 370 in Figure 4. Other guide rollers 371 are provided as may be necessary in order to space the gatherer chains in proper relation one with the other and with the associated snapping rolls. In this connection it is to be noted that each of the gatherer chains carries a plurality of gatherer fingers or lugs 373 which materially aid in handling the corn and which are arranged to move in operative association with the snapping rolls. As best illustrated in Figures 8 and 12, the individual lugs 373 on adjacent chains are arranged to register with one another in staggered relationship, that is, the lugs on adjacent chains are so arranged that one lug on one chain occupies a position substantially midway between two lugs on the adjacent chain. In this way the corn stalks are more easily and efficiently fed to the snapping rolls of the corn harvester.

One of the more important features of the present invention has to do with means for maintaining this spaced relationship or timed registration of the lugs on adjacent gatherer chains, and the means I have provided to that end will now be described. Referring more particularly to Figures 5 and 7, it will be observed that the drive for the several gatherer chains divides itself into four units. The gatherer chains 335 and 336 are driven from the shaft 340, the gatherer chains 287, 297 and 298 are driven from the short transverse shaft 269, the gatherer chains 317, 327 and 328 are driven from the short transverse shaft 270, and the gatherer chain 360 is driven from the stub shaft 362. As indicated above, in each of these units or groups one or more of the chains thereof operates in spaced or timed relation with respect to a chain or chains of an adjacent group. In order to prevent breakage and other damage following an excessive overload or other condition imposing extraordinary stresses on the parts, it is desirable to provide slip clutch mechanism for interrupting the drive to the gatherer chains. In other words, it is essential that the driving connections be so arranged that one or more of the chains can stop while the others continue to be driven. In machines of the prior art such means takes the form of releasable connections which are arranged to interrupt the drive upon the occurrence of an overload and which are adapted to reengage the instant the overload is released. It may occur, however, in a corn harvester or similar implement employing gatherer chains, that the interrupted chain or chains may be reengaged after an overload in such a position that the lugs thereof will not be in proper registration with the lugs on an adjacent chain. For example, should the lugs on adjacent chains be permitted to come opposite one another ears of corn coming between them would be crushed or the chain overloaded.

In order to assure proper registration of the chains at all times they are in operation slip clutches of novel construction are provided in the driving connections for each of the four groups of gatherer chains mentioned above. In Figure 7 the two slip clutches for the two intermediate groups of gatherer chains are indicated by the reference numerals 280 and 310. A slip clutch 380 is also provided between the sprocket 348 and the stub shaft 340 driven thereby, and a fourth slip clutch 381 is provided between the sprocket 364 and its stub shaft 362, see Figure 7.

The four slip clutches 280, 310, 380 and 381 are all similar in construction and hence only one is shown in detail in Figures 9 to 11, this being the slip clutch 380 associated with the shaft 340 shown in Figures 7 and 8. The slip clutch proper includes two toothed elements 400 and 401 respectively formed integrally with the driving sprocket 348 and the driven sprocket 339 which drives the gatherer chain 336. The driving sprocket 348 is journaled for rotation on the shaft 340 and is also slidable or axially movable thereon toward and away from the gatherer chain sprocket 339 which is pinned to the shaft 340. The sprocket 348 is biased for movement toward and is normally held in position against the sprocket 339 by a compression spring 403, and a collar 404 is pinned onto the stub shaft 340 forming an abutment for the compression spring 403. Adjacent each of the toothed clutch elements 400 and 401 is a pair of cam projections 405 and 406, and 407 and 408, respectively. The cam projections of each pair are positioned diametrically opposite one another and arranged to extend in an arc of substantially 90° around the axis of the clutch elements. When in engaged position, the toothed clutch elements 400 and 401 interlock, and the cam projections 405 and 406 engage between the cam projections 407 and 408 so that the parts are arranged in driving relation. It is to be observed that the ends of the cam projections are inclined.

Should an overload be thrown upon one of the gatherer chains, say the gatherer chain 335 driven by the sprocket 338 rotatable in fixed relationship with the shaft 340 and the lower sprocket 339 which carries the driving parts of the slip clutch mechanism 380, the cam projections 405 and 406 will ride upon the cam projections 407 and 408 and cause the driving sprocket 348 to move upwardly, thus disengaging the clutch elements 400 and 401 and therefore momentarily interrupting the drive from the main transverse shaft 221 and the driven stub shaft 340 driving both of the sprockets 338 and 339 and the associated gatherer chains. These projections 405 to 408 now operate to prevent a reengagement of the clutch elements 400 and 401 until the sprocket 348 has rotated one-half revolution. The other slip clutches 280, 310 and 381 are substantially identical with the slip clutch just described and operate in an identical manner.

The sprockets 350, 260, 261 and the sprocket associated with the shaft to which the bevel gear 365 is secured (see Figures 5 and 8) are all of the same size, and since the sprockets 348, 266, 267, and 364, which are respectively driven from the above mentioned sprockets, are also all of the same size, it will be seen that as the main transverse driving shaft 221 is rotated the shafts 340, 269, 270 and 362 will all be driven in unison and at the same speed or rate of rotation. Therefore, a half revolution of the sprocket 348 will correspond to a half revolution of the sprockets 266, 267 and 364, and also to a half revolution of the driven sprockets 338 and 339, 285, 295 and 296, 315, 325 and 326, and 361.

These last mentioned sprockets drive the gatherer chains and each sprocket is provided with twice the number of teeth, 12 in the illustrated embodiment, as there are links between lugs on the various gatherer chains. It becomes apparent, therefore, that, under the conditions assumed above where the chain 335 is overloaded and stops, this chain cannot become reengaged for driving relation until a half revolution of all of the driving sprockets has occurred, and since there are twice as many teeth on the driving sprockets for the chains as there are links between the lugs thereon a half revolution of the driving sprockets will correspond to a displacement of the gatherer chains equivalent to the distance between adjacent lugs thereon. Therefore, the chain 335, or any other chain subjected to an overload, will not become reengaged for driving relation until its lugs are brought into a position in proper registration with the lugs of the other chains.

Mechanism is provided for conveying the ears of corn removed from the stalks by the snapping rolls away from the snapping rolls and which comprises, generally, two endless conveyor or elevator chains 154 operating in a forwardly and downwardly inclined plane in the troughs 151 and 152 formed in the elevator bodies 148 and 149, as explained above, and a third elevator or conveyor chain 160 operating in a vertical plane. These three chains are driven from a second transverse shaft 420 which is journaled in two brackets 422 and 423 fixed on the under side of the upper ends of the elevator bodies 148 and 149. The shaft 420 is driven through the main transverse drive shaft 221 through a sprocket 425 connected to the transverse shaft 420 through a slip clutch 426 of conventional construction and which is connected through a driving chain 428 with a sprocket 429 fastened on a sleeve 430 journaled on a shaft 431 which is supported by bracket or brace 433 and the bracket 224, as best shown in Figure 5. The sleeve 430 is driven from the main transverse drive shaft 221 by means of a gear 435 fixed on the sleeve 430 and which meshes with a pinion 436 fixed to the drive shaft 221.

The shaft 420 carries a pair of bevel gears 439 fixed to it and which mesh with gears 440 keyed or otherwise secured to the stub shafts 442. See Figure 2. The stub shafts 442 are journaled in a longitudinal bracket 443 fixed on the under side of the elevator bodies 148 and 149, and at their upper ends these shafts are provided with sprockets 446 over which the upper bights of the elevator or conveyor chains 154 are trained. The lower ends of the elevators 154 are trained over idler sprockets 447, as shown in Figure 8.

For driving the third conveyor or elevator chain 160, which operates in a vertical plane, a shaft 450 is journaled in the upper part of the implement in substantial alignment with the shaft 420. The shaft 450 is connected at one end to the shaft 420 through a universal joint 451, see Figure 5, and at its other end it is connected through a universal joint 452 with a short shaft 453 journaled in brackets 455 and 456 supported on the lower side of the upper end of the elevator body 150. The short shaft 453 carries a sprocket 457 over which the upper bight of the elevator chain 160 is trained. The lower end of the chain 160 is trained over an idler sprocket mounted on a shaft 460 which is supported from the web 170 and the tunnel 130, as best shown in Figure 1. Risers 463 and 344 support the gatherer shields 464 and 465, and floating shoes or extensions 466 are pivotally supported from the ends of the members 212, see Figure 5.

As shown in Figure 4, the upwardly moving portions of the elevator chains 154 move the ears of corn upwardly and rearwardly along the troughs 151 and deposit them in a transverse chute 467 carried at the rear of the elevator bodies 148 and 149 while the elevator chain 160 removes the ears of corn from the snapping rolls 197 and 198 and deposits them directly into the hopper 468 into which the chute 466 empties.

The hopper 468 discharges into the elevator 5, as shown in Figures 1 and 12. The elevator 5 comprises side members 470 and 471 suitably reinforced and braced by angle members 474 and tension braces 475 as indicated in Figure 1. The elevator 5 normally occupies a downwardly and forwardly inclined position so as to bring its receiving end with its elevator hopper 477 underneath the discharge spout of the corn harvester hopper 468 to receive the discharge of ears therefrom.

The elevator 5 is supported at its front end by a supporting member 479 connected across the front of the tractor and from which it may be readily disconnected. Approximately midway between its upper and lower ends the elevator 5 is supported on the tractor so as to be capable of swinging about a horizontal axis thereon. This supporting means is best illustrated in Figures 1 and 13. Two arms 480 and 481 are fixed to the sides 470 and 471 of the elevator and are extended below the bottom wall of the same to pivotally receive a driving shaft 483. This driving shaft is itself received by and journaled in the upper arms 485 and 486 of a U-shaped bracket 487. The bracket is supported upon a vertical sleeve 488 which is journaled for movement about a vertical axis in a suitably formed supporting bracket 490 rigidly connected to the tractor. The drive shaft 483 carries at its outer end a sprocket 491 over which is trained a chain 492 connected at its upper end to the usual conveyor apron 493 operating over the bottom of the elevator.

The drive shaft 483 carries fixed thereto a bevel gear 495 in mesh with and driven by a bevel gear 496 carried at the upper end of a vertically extending drive shaft 497 occupying a position substantially in the axis of the swinging U-shaped bracket 487. The lower end of the vertical shaft 497 carries a sprocket 498 which is connected by means of a sprocket chain 499 with a sprocket 500 secured at the upper end of a shaft 501 journaled on the tractor and connected through the universal joints 502 and a pair of bevel gears 503 with the power take-off of the tractor. By virtue of this construction the apron or conveyor means 493 of the elevator 5 is driven independently of the vertical or horizontal swinging movement of the elevator 5 itself.

As shown in full lines in Figure 12, normally the elevator 5 conveys the ears received from the harvester hopper 468 upwardly and rearwardly and deposits them into the tank 4 pulled at the rear of the tractor 2. When the tank 4 is to be unloaded, the elevator 5 is disconnected from its front support 479 and is swung around to the position shown in dotted lines in Figure 12, swinging the elevator hopper 477 underneath the tank 4 so that by opening a trap door 506 in the tank its contents will be emptied into the elevator hopper 477. Operation of the elevator 5 will then deliver the contents of the tank 4 into a wagon or truck drawn up beside the machine.

The operation of my improved agricultural machine is substantially as follows: The machine is driven across the field and along the corn rows so that the stalks pass in between the pointed extensions or shields 466 and into position to be operated upon by the snapping rolls 193 to 198, the various gatherer chains aiding in feeding the corn stalks through the snapping rolls. Should any one or more of the gatherer chains be subjected to an overload that chain or chains will stop, by virtue of my improved slip clutch mechanism, and will not become reengaged again, even if the overload is relieved, until the lugs on the other chains come into proper registration with the lugs on the stopped chain. As the ears of corn are removed from the stalks by the three sets of snapping rolls the elevator or conveyor chains 154 and 160 convey the ears rearwardly and discharge them into the chute 467 and the hopper 468 from which they drop into the receiving hopper 477 of the elevator 5 which delivers the corn into the tank or bin 4.

The machine is easily manipulated and easily steered down the corn rows by virtue of the improved connections between the dirigible wheels of the implement and the steering system of the tractor itself, in conjunction with the improved draft connections between the implement frame and the front end of the tractor. These connections are such, as described above, that the implement is permitted to rise and fall relative to the tractor but such motion does not affect the leveling adjustment of the implement nor does such movement cause any turning movements to be transmitted to the dirigible wheels 80 and 81 of the implement. The journal support of the main casting 20 on the longitudinal extending pipe 11 permits the implement to take various angular positions about a horizontal axis relative to the tractor but which in no way affect the angular position of the implement in a vertical plane with respect to the tractor.

After the bin or tank is filled a wagon or truck is brought alongside the machine and then the elevator 5 is released from its front support 480 and is rotated through substantially 180° about the axis 497 of its vertical support to bring its receiving hopper immediately under the discharge opening in the tank 4. Then the elevator mechanism is operated and as the corn in the tank 4 is discharged into the receiving hopper of the elevator the latter conveys the corn from the tank 4 into the truck or wagon.

In Figures 14 to 16, I illustrate the type of connections between a tractor and an agricultural implement shown in my copending application referred to above. As there disclosed, a harvester or binder 500 is applied to a tractor 501 of the usual type. The harvester or binder is mounted upon a truss or frame member 502 which extends transversely and in front of the tractor 501 and comprises an upper and a lower member connected together by a plurality of diagonal braces, somewhat similar to the corresponding frame member shown in my copending application, Serial No. 119,608, filed June 30, 1926. A pair of wheels 503 and 504 are journaled on the outer ends of the frame member 502, the wheels 503 and 504 being so mounted that they are steered simultaneously and differentially with the front steering wheels 505 and 506 of the tractor. The steering arm 508 of the tractor is extended forwardly, as at 509, and is connected with a bell crank 510 which, in turn, controls the position of the drag link 511 whereby the wheels 503 and 504 are steered, as is clear from Figure 14.

The draft connection between the front end of the tractor and the transverse frame member 502 of the harvester or binder comprises a pair of links 513 and a second pair of links 514 disposed in parallel relation below and of substantially the same length as the pair of links 513. These pairs of links 513 and 514 diverge forwardly and are connected by suitable pivot means 515 to the upper and lower members, respectively, of the transverse frame 502. The links of each pair may be rigidly connected together by means of suitable bracing members 517 and 518, whereby each pair of links form a rigid draft transmitting framework.

The rearward ends of the pairs of links 513 and 514 are pivoted to a draft member in the form of a casting 520. The casting member 520 is journaled upon the front end of a tractor by means which I shall presently describe. From the description thus far it will be apparent that the frame member 502 of the harvester or binder may have up and down movement relative to the tractor, but which is, nevertheless, maintained in a vertical plane with respect to the longitudinal axis of a tractor because of the equal lengths of the pairs of links 513 and 514 and their parallel relationship.

A supporting arm 523 is secured to the tractor and extends forwardly therefrom to form a bearing or axle 524 which is of substantial length and which receives the draft member 520 rotatable thereon.

As is shown in Figure 16, the supporting arm 523 is secured to the front of the tractor by means of a plate 525 having an aperture therein to receive the arm 523, the plate 525 being secured to the front face of the front axle of the tractor by means of bolts 526. A shoulder 528 of the arm 523 bears against the front face of the plate 525. The supporting arm 523 extends underneath the tractor and at its end is rigidly connected to the radius rods 530 by means of two plates 531 and 532. The ends of the plates 531 and 532 are clamped to the radius rods by means of bolts 534, and the arm 523 is clamped between the plates 531 and 532 by means of a bolt 535. The draft member 520 is securely held in position on the bearing 524 by means of a collar 537 fastened on the end of a bearing 524 by a bolt 538.

It will thus be seen that by virtue of the pairs of links 513 and 514 the harvester is capable of up and down movement, relative to the tractor, but which is, at the same time, properly held in its vertical position. It is also seen that by virtue of the journaled connection at 524 the harvester may tilt laterally with respect to the tractor while still being maintained in its proper vertical position, and either side of the harvester may rise or fall independently of the front wheels of a tractor. This connection, therefore, provides a full universal connection between the harvester and the tractor.

The harvester mechanism is mounted on the truss or frame member 502 by means of two downwardly and forwardly extended supporting members 540 and 541 which are pivoted near their upper ends in bearings 542 and 543 carried at the upper or top side of the frame member 502. These supporting members 540 and 541 support a framework comprising an upper transverse channel member 545 and a lower transverse butt conveyor chain housing 546. The channel member 545 and the housing 546 are secured together at their ends by means of two downwardly and forwardly extending channel irons or members 547 and 548.

The angular position of this forwardly and downwardly inclined framework is controlled by cables 550 and 551 which are fastened to the rear ends of the supporting members 540 and 541. These cables 550 and 551 are trained around rollers 552 and 553, respectively, and are connected to a windlass or hoist 554. The windlass 554 is controlled by a worm and gear housed in the housing 555, the worm being connected by a universal joint 556 to a rod 557 which extends therefrom back to the operator's seat on the tractor. Referring to Figure 15 it will be seen that rotation of the rod 557 is operative to actuate the windlass 554 to raise or lower the forward part of the harvester.

The cutting and conveying mechanism of the harvester includes the usual sickle 559 and the usual canvas slatted conveyor mounted on the framework and adapted to operate around rollers 561 and 562 rotatably mounted thereon.

For further details of the harvester reference may be had to my copending application Serial No. 406,192, mentioned above. It will be observed from the above description, however, that the harvester implement 500 is capable of vertical movement relative to the tractor but that the harvester is prevented from rocking fore and aft. In other words the angular position of the implement in a vertical longitudinal plane does not change even when the machine is traveling over rough ground. In addition, the whole implement may rotate laterally about the axis of the arm 524. Thus a flexible connection between the implement and the tractor is provided but one which holds the implement in proper position at all times.

It is also to be observed that by virtue of the link 509 and associated structure the dirigible wheels 503 and 504 of the implement are steered with the steering of the front wheels 505 and 506 of the tractor. The implement is adjusted for fore and aft position to raise or lower the sickle 559 by the windlass 554 which, in turn, is operated by the rod 557 from the operator's station on the platform.

The sickle bar 559 and the several conveying, binding, and tying mechanisms are all driven from a main drive shaft 580 which in turn is driven through a set of driving gears housed in a housing 581. The gears in the housing 581 are driven through a pair of universal joints 582 and 583 from a power take-off shaft 585. The power take-off shaft 585 is driven from the motor of the tractor preferably, but it may be driven from any convenient source of power. The driving end of the main shaft 580 is journaled in a boring in the pivoting hub of the member 540, the axis of the shaft 580 and the pivoting axis of the members 540 and 541 coinciding. In this manner tilting of the implement to adjust the vertical position of the same will not affect the driving or operating connections.

While I have shown and described the preferred structural embodiment of my invention it is to be understood that my invention is not to be limited to the specific means shown and described, bu that, in fact, widely different means may be employed in the practice of the broader aspects of my invention.

What I claim, therefore, and desire to secure by Letters Patent is:

1. In combination with a tractor, an implement adapted to be propelled thereby, and connecting means between the forward end of the tractor and the implement operative to permit vertical movement relative to the tractor and to prevent angular movement in a longitudinal plane relative to the tractor.

2. In combination with a tractor, an implement adapted to be propelled thereby, and connecting means between the forward end of the tractor and the implement operative to permit vertical movement relative to the tractor and to prevent angular movement relative to the tractor in a longitudinal plane, said connecting means including relatively rotatable parts adapted to permit the implement to have angular movement in a transverse plane relative to the tractor.

3. In combination with a tractor, an implement adapted to be propelled thereby, and connecting means between the tractor and the implement operative to permit vertical movement relative to the tractor and to prevent angular movement relative to the tractor in a longitudinal plane, said connecting means including spaced links of equal length and means pivotally connecting the ends of said links to the tractor and the implement respectively.

4. In combination with a tractor, an implement adapted to be propelled thereby, and connecting means between the tractor and the implement operative to permit vertical movement relative to the tractor and to prevent angular movement relative to the tractor in a longitudinal plane, said connecting means including a plurality of links spaced vertically and means connecting the ends of the links to the tractor and to the implement.

5. In combination with a tractor, an implement adapted to be propelled thereby, and connecting means between the tractor and the implement operative to permit vertical movement relative to the tractor and to prevent angular movement in a longitudinal plane relative to the tractor, said connecting means including a longitudinally extending arm secured to the front end of said tractor, a member journaled on said arm for movement about a generally longitudinal axis and providing a plurality of pivot points, spaced pairs of links of substantially equal length, each having one end connected to the member at one of said pivot points and the other end pivotally connected to said implement.

6. An attachment for a tractor having a front axle, said attachment comprising a member having means securing it to the front axle, a forwardly extending arm carried thereby, a second member journaled on the arm and adapted for rocking movement in a transverse plane relative to the tractor, a plurality of links of substantially equal length, each pivoted at one end to said second member, and a frame member to which is pivoted the other end of each of the links.

7. An agricultural machine comprising, in combination, a tractor, an implement, connecting means between the tractor and the implement operative to permit vertical movement relative to the tractor and to prevent angular movement in a longitudinal plane relative to the tractor, said connecting means comprising a plurality of link means, and means for displacing one of said link means in a generally horizontal direction for adjusting the angular position of said implement.

8. An agricultural machine comprising, in combination, a tractor, an implement adapted to be propelled thereby, means connecting the implement to the tractor for movement with respect thereto, said means comprising a system of links arranged in parallelism, said links being pivoted to the implement, means connecting the links to the tractor and including a swingably mounted arm mounted on the tractor for rocking movement and connected to one of said links, and means for rocking said arm to adjust the position of the implement.

9. An agricultural implement comprising, in combination, a tractor having steering wheels, an implement adapted to be propelled by the tractor and including dirigible wheels, a steering arm for each of said wheels, connecting means for flexibly connecting the implement and the tractor and including a parallel link structure, and means connecting said steering arms with the steering wheels of the tractor and including link means extending in substantial parallelism with said parallel link structure, whereby changes in the position of the implement relative to the tractor will not affect the position of the dirigible wheels of the implement.

10. An agricultural implement comprising, in combination, a tractor having steering wheels, an implement adapted to be propelled by the tractor and including dirigible wheels, a steering arm for each of said wheels, connecting means between the tractor and the implement operative to permit vertical movement relative to the tractor and to prevent angular movement in a longitudinal plane relative to the tractor, said connecting means including a longitudinally extending arm secured to the front end of said tractor, a member journaled on said arm and providing a plurality of pivot points, spaced pairs of links of substantially equal length, each having one end connected to the member at one of said pivot points and the other end pivotally connected to said implement, a steering lever pivoted on said journaled member, links connecting the ends of said lever to the steering arms of said dirigible wheels, said links extending substantially parallel with respect to and of the length substantially equal to said pairs of links, and means for swinging the steering lever coincidentally with the tractor steering wheels.

11. An agricultural implement comprising, in combination, a tractor, an implement adapted to be propelled thereby and including dirigible wheels, connecting means between the implement and tractor and including a link structure pivotally connected with the tractor and with the implement, and steering means for said dirigible wheels comprising link means positioned substantially in a plane parallel to said link structure.

12. An agricultural implement comprising, in combination, a tractor, an implement adapted to be propelled thereby and including dirigible wheels and steering arms therefor, connecting means between the implement and tractor and including a link structure pivotally connected with the tractor and with the implement, means for tilting the implement in a vertical plane about a horizontal axis, and steering means for said dirigible wheels comprising link means pivoted to said steering arms at a point substantially in said horizontal axis, whereby tilting of the implement will not affect the steering position of said dirigible wheels.

13. An agricultural implement comprising, a frame, a plurality of gatherer chains movably mounted in said frame, said chains being oppositely arranged and provided with cooperating lugs, the lugs of one chain operating in predetermined spaced relation with the lugs of another chain, and means for driving all of said chains including overload release mechanism arranged to maintain said predetermined relation of the lugs.

14. An agricultural implement comprising a frame, a plurality of snapping rolls journaled therein, a pair of oppositely disposed gatherer chains cooperating with said rolls and provided with lugs, the lugs of one chain being arranged to operate in staggered relationship with the lugs of the other chains, sprockets for driving the chains, one for each chain and having twice as many teeth as there are links between successive lugs on a chain, each of said sprockets having the same number of teeth, means for driving each sprocket including a slip clutch mechanism whereby the drive to either chain may be interrupted upon overload, and cam means cooperating with said slip clutch mechanism for preventing reengagement of the slip clutch mechanism until the sprocket of the interrupted chain has remained stationary a period corresponding to a half revolution of the other sprockets, so that the staggered relation of the lugs of said two gathering chains is maintained as long as both chains are driven.

15. A corn picker of the class described comprising, in combination, a frame, snapping mechanism carried by said frame, a tank in rear of said mechanism, and a movably mounted conveyor operable in one position to convey ears of corn from said snapping mechanism and convey them into said tank and in another position to receive ears of corn from said tank and convey them away from said tank and picker.

16. An agricultural implement comprising, in combination, a tractor having a power take-off, a corn picker including snapping mechanism propelled by the tractor and mounted forwardly thereof, conveyors adapted to receive ears of corn from said snapping mechanism, a grain tank connected to the rear of the tractor and propelled thereby, an inclined elevator pivotally carried for movement about a vertical axis and provided with a receiving hopper at its lower end and a discharge chute at its upper end, said elevator being movable to two positions approximately 180° apart, one bringing the hopper in a position to receive corn from said conveyors and discharge them into said tank, the other bringing the hopper in position to receive corn from said tank and discharge it therefrom, means pivotally mounting the elevator on the tractor and comprising a bracket secured to the tractor and a yoke journaled in said bracket for movement about a vertical axis and connected with said elevator, and means driving the elevator from the power take-off of the tractor.

17. A corn picker comprising a pair of supporting wheels, a plurality of sheet metal stampings, each of channel cross section and extending longitudinally, bracket means for said supporting wheels and connecting them to said stampings, and snapping mechanism carried by said stampings.

18. An agricultural implement comprising a corn picker having a pair of dirigible supporting wheels, a plurality of sheet metal stampings of substantially inverted channel cross section, brackets connecting the side flanges of each of said channel sections and providing vertical journals for said wheels, brackets connecting adjacent stampings, snapping mechanism journaled in said last named brackets, a transverse frame member connecting the last named brackets, triangular sheet metal members connected between said stampings and with the transverse frame member, said triangular members being disposed vertically, and a lower frame member connecting the lower portions of said sheet metal members.

19. An agricultural implement comprising a plural row corn harvester having a plurality of sets of snapping rolls, frame means supporting said rolls, elevator means operating in a forwardly and downwardly inclined plane and arranged to remove ears of corn from certain of said sets of rolls, and elevator means operating in a vertical plane and arranged to remove ears of corn from another set of snapping rolls.

20. A three row corn picker comprising a supporting frame means, supporting wheels therefor, three sets of snapping rolls carried by said frame means, three elevators operating in conjunction with said rolls, two of said elevators operating in a forwardly and downwardly inclined plane and another elevator operating in a longitudinal vertical plane, said two elevators embracing said supporting wheels, and means for driving said rolls and elevators.

21. An agricultural machine comprising a tractor, an implement adapted to be propelled thereby, connecting means between the tractor and the implement operative to permit vertical movement relative to the tractor and to prevent angular movement in a longitudinal plane relative to the tractor, dirigible supporting wheels for said implement, steering means operated from the tractor for said dirigible wheels, said implement comprising a frame having a plurality of sheet metal stampings, each of channel cross section and extending longitudinally, bracket means for said supporting wheels connected with said stampings, a plurality of gatherer chains movably mounted in said frame, said chains being oppositely arranged and provided with cooperating lugs, the lugs of one chain operating in predetermined spaced relation with the lugs of another chain, and means for driving said gatherer chains including overload slip clutches arranged to reengage only when the lugs of said chains are in predetermined relative position.

22. An agricultural machine comprising, in combination, a tractor having steering means, a power take-off, an implement adapted to be propelled thereby, a receiving tank propelled by the tractor, means connecting the implement to the tractor for movement with respect thereto, said means comprising a system of links arranged in parallelism, means for moving certain of said links to tilt the implement with respect to the tractor, dirigible wheels for the implement, steering means therefor including parts positioned in the axis of movement of the implement and operable in conjunction with the steering means of the tractor, harvesting mechanism carried by said implement and including sheet metal stampings forming the frame thereof, a plurality of separately driven units supported by said stampings and operable in predetermined spatial relationship, driving means for said units and including separate connections therefor having automatically releasable and engageable means arranged to maintain said predetermined relationship and a plurality of conveyor means cooperating with said units and operable in different and angularly related planes, an elevator adapted to receive the discharge from said conveyor means and to deposit it in said receiving tank, said elevator being mounted on the tractor, and means for operating said driving means and said elevator from the power take-off of the tractor.

23. An agricultural machine comprising, in combination, a tractor having a power take-off, an implement adapted to be propelled thereby, means connecting the implement to the tractor for movement with respect thereto, said means comprising a system of links arranged in parallelism, means for moving certain of said links to tilt the implement with respect to the tractor, supporting wheels for the implement, a plurality of separately driven units carried by said implement and operable in predetermined spatial relationship, driving means for said units and including separate connections therefor having automatically releasable and engageable means arranged to maintain said predetermined relationship, and means for operating said driving means from the power take-off of the tractor.

24. An agricultural machine comprising, in combination, a tractor having steering means, a power take-off, an implement adapted to be propelled thereby, a receiving tank propelled by the tractor, means connecting the implement to the tractor for movement with respect thereto, said means comprising a system of links arranged in parallelism, means for moving certain of said links to tilt the implement with respect to the tractor, supporting wheels for the implement, said implement having a frame including a member arranged transversely of the tractor with which certain of said links are connected, a plurality of separately driven units carried by said implement, driving means for said units including separate connections therefor, and means for operating said driving means from the power take-off of the tractor.

25. An agricultural machine comprising, in combination, a tractor having steering means and a power take-off, an implement adapted to be propelled thereby, means connecting the implement to the tractor for movement with respect thereto and comprising a system of links arranged in parallelism, means for moving certain of said links to tilt the implement with respect to the tractor, supporting wheels for the implement, steering means therefor operable in conjunction with the steering means of the tractor, said implement including sheet metal members disposed in laterally spaced relation and forming the frame of the implement, a plurality of separately driven units supported by said sheet metal members, a transverse member connecting said sheet metal members, certain of said links being connected to said transverse member and means for operating said driving means from the power take-off of the tractor.

26. An agricultural implement comprising, in combination, a tractor, an implement adapted to be propelled thereby, connecting means disposed between the tractor and the implement and comprising a plurality of movable members operative to permit vertical movement of the implement relative to the tractor and to prevent relative angular movement of the implement relative to the tractor, and means for shifting certain of said members to adjust the angular position of the implement relative to the tractor.

27. An agricultural implement comprising, in combination, a tractor, an implement adapted to be propelled thereby, connecting means between the tractor comprising a plurality of longitudinal members arranged as parallel links, and means for shifting the position of certain of said members in a fore and aft direction to determine the angular position of the implement relative to the tractor.

28. An agricultural implement comprising, in combination, a tractor, an implement adapted to be propelled thereby, draft transmitting means between the tractor and implement comprising upper and lower parallel links connected at their rear ends with the tractor and at their forward ends with the implement, and means for shifting certain of said links to determine the angular position of the implement relative to the tractor.

29. An agricultural implement comprising, in combination, a tractor having steering means, an implement adapted to be propelled by the tractor, said implement having shiftable supporting wheels, draft transmitting means connecting the implement with the tractor and comprising a system of parallel links connected at one end with the tractor and at the other end with the implement, and means for shifting certain of said links to determine the angular position of said implement relative to the tractor, said supporting wheels of the implement shifting in accordance with the steering means of the tractor.

30. An agricultural implement comprising, in combination, a tractor and implement adapted to be propelled thereby, upper and lower link means serving to connect the implement with the tractor, and means for shifting one of said link means to adjust the angular position of the implement.

31. An agricultural implement comprising, in combination, a tractor and implement adapted to be propelled thereby, upper and lower link means serving to connect the implement with the tractor, and means for shifting the upper link means to adjust the angular position of the implement.

32. An agricultural implement comprising, in combination, a tractor having steering wheels, an implement adapted to be propelled by the tractor and including dirigible wheels, a steering arm for each of said wheels, connecting means for flexibly connecting the implement and the tractor and including a parallel link structure, and means connecting said steering arms with the steering wheels of the tractor.

33. An agricultural implement comprising, in combination, a tractor having steering wheels, an implement adapted to be propelled by the tractor in advance thereof and including dirigible wheels, a steering arm for each of said wheels, connecting means for flexibly connecting the implement with the forward portion of the tractor and including a parallel link structure, and means connecting said steering arms with the steering wheels of the tractor.

34. An agricultural machine comprising a frame, a plurality of gatherer chains movably mounted thereon, said chains being arranged adjacent one another and provided with cooperating lugs, the lugs of one chain being arranged to operate in spaced relation intermediate the lugs of the other chain, and means operative to maintain said predetermined relation of the lugs.

35. An agricultural machine comprising an operating mechanism and a pair of juxtaposed gatherer chains having spaced stalk feeding means thereon, the stalk feeding means of one chain being adapted to operate in between the stalk feeding means of the other chain, a plurality of sprockets arranged to support the chains, and means cooperating therewith to maintain the proper spaced relation of said cooperating stalk feeding means.

36. An agricultural implement comprising an operating mechanism and a pair of mutually cooperating gathering chains having spaced stalk feeding means thereon operating in staggered relation, a plurality of sprockets arranged to support said chains, and means for driving the sprockets including engageable and disengagable parts adapted to be engaged only when said stalk feeding means occupy their proper staggered relation.

37. An agricultural implement comprising a frame, a plurality of snapping rolls journaled therein, a pair of oppositely disposed gatherer chains cooperating with said rolls and provided with lugs, the lugs of one chain being arranged to operate in staggered relationship with the lugs of the other chains, sprockets for driving the chains, means for driving each sprocket including a slip clutch mechanism whereby the drive to either chain may be interrupted upon overload, and means cooperating with said slip clutch mechanism for preventing reengagement of the slip clutch mechanism after disengagement until the sprocket of the interrupted chain has remained stationary a period corresponding to a movement of the other chain corresponding to the distance between adjacent lugs on the interrupted chain.

38. An agricultural implement comprising a frame, a plurality of snapping rolls journaled therein, a pair of oppositely disposed gatherer chains cooperating with said rolls and provided with lugs, the lugs of one chain being arranged to operate in staggered relationship with the lugs of the other chains, sprockets for driving the chains, means for driving each sprocket including a slip clutch mechanism whereby the drive to either chain may be interrupted upon overload, and means cooperating with said slip clutch mechanism and arranged in correspondence with the relation between the number of teeth on these sprockets and the number of links between successive lugs on said chains for preventing reengagement of the slip clutch mechanism after disengagement until the chain opposite the interrupted chain has moved a distance corresponding to the distance between lugs on the interrupted chain.

39. An agricultural implement comprising a frame, a plurality of snapping rolls journaled therein, a pair of oppositely disposed gatherer chains cooperating with said rolls and provided with lugs, the lugs of one chain being arranged to operate in staggered relationship with the lugs of the other chains, sprockets for driving the chains, means for driving each sprocket including a slip clutch mechanism whereby the drive to either chain may be interrupted upon overload, and means cooperating with said slip clutch mechanism for preventing reengagement of the slip clutch mechanism after disengagement until the interrupted chain has remained stationary a period dependent upon the relation between the number of teeth of the sprockets and the number of links between successive lugs on the chains, so that the staggered relation of the lugs of said two gatherer chains is always maintained.

40. An agricultural machine of the class described comprising, in combination, a frame, operating mechanism carried by said frame, a tank and means including a shiftable conveyor and adapted to be optionally disposed in either of two positions either to convey material from said mechanism into said tank or to receive material from said tank and convey it away from said tank.

41. An agricultural machine of the class described comprising, in combination, a frame, operating mechanism carried by such frame, a grain tank spaced from said mechanism and means including a conveyor having a movably mounted part shiftable to two positions, said conveyor being operable in one position of said movable part to convey material from said mechanism into said tank and in another position of said movable part to receive material from said tank and convey it away therefrom.

42. An agricultural implement of the class described comprising, in combination, a wheeled frame, a grain tank, an operating mechanism, and conveyor means carried by the frame and adjustable thereon to two different positions relative to said grain tank and said operating mechanism, said conveyor means being operable in one position of adjustment to convey material from said operating mechanism to said tank and in another position of adjustment to receive material from said tank and to convey the same away therefrom.

43. An agricultural machine comprising, in combination, a wheeled frame, operating mechanism, a grain tank disposed rearwardly of said mechanism, conveyor mechanism carried by said frame and including relatively movable parts shiftable to a plurality of positions relative to said grain tank and operable in one position to convey material from the operating mechanism to said tank and in another position to receive material from the tank and to convey it away therefrom, and means journaled on the wheeled frame for driving said conveyor.

44. An agricultural machine comprising, in combination, a traction unit, an operating unit, and a grain tank unit, a conveyor swingably mounted on the traction unit for disposition in a plurality of positions relative to said operating and grain tank units and operable in one position to receive material from the operating unit and to convey the same to said tank unit and operable in another position to receive material from said tank and to convey the same therefrom, and means on the traction unit for driving the conveyor in its optional positions.

45. An agricultural implement of the class described comprising, in combination, a frame, operating mechanism, a grain tank, an optionally operable conveyor mechanism including movable parts, said optionally operable conveyor mechanism being shiftable to two different positions relative to said operating mechanism and said grain tank and arranged in one position to convey material rearwardly from said operating mechanism and to deliver the material to said tank and operable in another position to receive material from the tank and to convey the same to a point spaced laterally thereof.

46. An agricultural implement of the class described comprising, in combination, a wheeled frame, an operating unit, a grain tank unit, and a swingably mounted conveyor carried by said wheeled frame and including a downwardly disposed receiving end and an upwardly disposed discharge end, said conveyor being shiftable in one position to dispose its receiving end under the operating unit to receive material therefrom and to deliver the same to said grain tank unit, said conveyor being operable in another position to dispose its lower receiving end under the grain tank unit and to discharge material received therefrom to a point spaced from the grain tank unit.

47. An agricultural implement of the class described comprising, in combination, a wheeled frame, an operating unit, a grain tank unit, and conveyor mechanism carried by the wheeled frame and including a portion adapted to be disposed longitudinally of the frame and a portion disposed laterally with respect to the first named portion, said conveyor mechanism being adapted to be arranged to receive material from the operating unit and to deliver the same to the tank unit or to receive material from the tank unit and to deliver the same laterally.

48. An agricultural implement comprising, in combination, a tractor having a power take-off, a corn picker including snapping mechanism propelled by the tractor and mounted forwardly thereof, conveyors adapted to receive ears of corn from said snapping mechanism, a grain tank connected to the rear of the tractor and propelled thereby, a movable elevator provided with a receiving hopper at one end and a discharge chute at the other end, said elevator being movable to two positions, one bringing the hopper in a position to receive corn from said conveyors and discharge it into said tank, the other bringing the hopper in position to receive corn from said tank and discharge it therefrom, and means driving the elevator from the power take-off of the tractor.

49. A corn picker comprising a pair of supporting wheels, a plurality of sheet metal stampings, each of channel cross section and extending longitudinally, bracket means for said supporting wheels and connecting them to said stampings, vertically disposed sheet metal tunnels, one disposed between adjacent stampings, transversely extending bars connecting said stampings and said tunnels at their rear portions, and snapping mechanism carried by said stampings.

50. An agricultural implement comprising a plural row corn harvester having a plurality of sets of snapping rolls, frame means supporting said rolls, centrally disposed elevator means operating in a forwardly and downwardly inclined plane and arranged to remove ears of corn from certain of said sets of rolls, and elevator means disposed near one side of the harvester and operating in a vertical plane and arranged to remove ears of corn from another set of snapping rolls.

51. An agricultural implement of the class described comprising, in combination, a wheeled frame, an operating unit, a grain tank unit, and conveyor mechanism carried by the wheeled frame and including a main conveyor portion and a second portion disposed laterally with respect to the first named portion, said conveyor mechanism being shiftable to two positions, one to receive material from the operating unit and to deliver the same to the tank unit and the other to receive material from the tank unit and to deliver the same laterally.

52. In an agricultural implement having a pair of relatively rotatable means adapted to be connected together in a given angular relation, a slip clutch mechanism adapted to releasably connect said means and including a pair of separable parts connected, respectively, with said means, means urging said parts toward mutual engagement, and means providing for their mutual engagement only in such a predetermined relative position that said given angular relation of the relative rotatable means is maintained.

53. In an agricultural implement having a pair of relatively rotatable means adapted to be connected together in any one of a certain number of predetermined angular positions, a slip clutch mechanism adapted to releasably connect said means and including a pair of separable parts connected, respectively, with said means, means urging said parts toward mutual engagement, and means providing for their mutual engagement only in any one of such angular positions.

54. In an agricultural implement having a pair of relatively rotatable means adapted to be connected together in any one of a certain number of predetermined angular positions, a slip clutch mechanism adapted to releasably connect said means and including a pair of separable parts connected, respectively, with said means, said parts having mutually interengaging faces provided with a plurality of interengageable radial ribs and complementary concentric cam portions, and means urging said parts toward mutual engagement.

55. In an agricultural implement having a pair of relatively rotatable means adapted to be connected together in any one of a certain number of predetermined angular positions, a slip clutch mechanism adapted to releasably connect said means and including a pair of separable parts connected, respectively, with said means, said parts having mutually interengaging faces provided with a plurality of interengageable radial ribs and complementary concentric cam portions disposed radially outwardly of said ribs, and means urging said parts toward mutual engagement.

56. An agricultural implement comprising, in combination, a tractor and implement adapted to be propelled thereby, spaced link means serving to connect the implement with the tractor, and means for shifting one of said link means to adjust the angular position of the implement.

57. An agricultural implement comprising, in combination, a tractor and wheel supported implement adapted to be propelled thereby, spaced link means serving to connect the implement with the tractor, and means for shifting one of said link means to adjust the angular position of the implement.

EDGAR E. METCALF.